US011480444B2

(12) United States Patent
Malagon et al.

(10) Patent No.: US 11,480,444 B2
(45) Date of Patent: Oct. 25, 2022

(54) SYSTEMS AND METHODS OF CAPTURING USAGE DATA FROM AN AMR DEVICE

(71) Applicant: Insight Energy Ventures, LLC, Royal Oak, MI (US)

(72) Inventors: Manuel Malagon, Utica, MI (US); Matthew P. Tilchen, Byron Center, MI (US)

(73) Assignee: Insight Energy Ventures, LLC, Royal Oak, MI (US)

( * ) Notice: Subject to any disclaimer, the term of this patent is extended or adjusted under 35 U.S.C. 154(b) by 90 days.

(21) Appl. No.: 16/960,828

(22) PCT Filed: Jan. 11, 2019

(86) PCT No.: PCT/US2019/013250
§ 371 (c)(1),
(2) Date: Jul. 8, 2020

(87) PCT Pub. No.: WO2019/140232
PCT Pub. Date: Jul. 18, 2019

(65) Prior Publication Data
US 2020/0400461 A1    Dec. 24, 2020

Related U.S. Application Data

(60) Provisional application No. 62/616,680, filed on Jan. 12, 2018.

(51) Int. Cl.
*G01D 4/00* (2006.01)
*H04B 1/7156* (2011.01)
*H04Q 9/02* (2006.01)
(52) U.S. Cl.
CPC .......... *G01D 4/006* (2013.01); *H04B 1/7156* (2013.01); *H04Q 9/02* (2013.01); *H04Q 2209/40* (2013.01); *H04Q 2209/60* (2013.01)

(58) Field of Classification Search
CPC .......... G01D 4/00; G01D 4/002; G01D 4/004; G01D 4/006; H04B 1/713; H04B 1/7156;
(Continued)

(56) References Cited

U.S. PATENT DOCUMENTS 6,934,316 B2    8/2005  Cornwall et al.
7,577,181 B2    8/2009  Cornwall et al.
(Continued)

FOREIGN PATENT DOCUMENTS

WO    2015162835 A1    10/2015
WO    2016021728 A1    2/2016

OTHER PUBLICATIONS

International Search Report from PCT/US19/13250 dated Mar. 18, 2019, 3 pages.

*Primary Examiner* — Franklin D Balseca
(74) *Attorney, Agent, or Firm* — Warner Norcross + Judd LLP

(57)    ABSTRACT

A method of capturing usage data of a usage area, which includes an automatic meter reading (AMR) device that broadcasts the usage data over a sequence of radio-frequency (RF) channels via a frequency-hopping spread spectrum (FHSS) signal. The method includes the steps of providing an RF receiver for the usage area, determining the sequence of RF channels, and receiving the usage data by tuning the RF receiver to an RF channel based on the sequence of RF channels. The sequence of RF channels includes an array of RF channels assigned to and ordered based on a channel position.

22 Claims, 18 Drawing Sheets

(58) Field of Classification Search
CPC .. H04B 1/71563; H04B 1/71566; H04Q 9/00; H04Q 9/02; H04Q 2209/00; H04Q 2209/40; H04Q 2209/50; H04Q 2209/60; H04Q 2209/80; H04Q 2209/82; H04Q 2209/826

See application file for complete search history.

(56) References Cited

U.S. PATENT DOCUMENTS

| | | | |
|---|---|---|---|
| 7,626,511 B2 | 12/2009 | Lazar | |
| 7,830,874 B2 | 11/2010 | Cornwall et al. | |
| 7,957,322 B2 | 6/2011 | Reeves, III et al. | |
| 8,242,887 B2 | 8/2012 | Cornwall et al. | |
| 8,310,341 B2 | 11/2012 | Cornwall et al. | |
| 8,406,933 B2 | 3/2013 | Nagel et al. | |
| 8,514,540 B2 | 8/2013 | Besore et al. | |
| 8,676,388 B2 | 3/2014 | Dodderi et al. | |
| 8,923,287 B2 | 12/2014 | Cornwall et al. | |
| 9,082,294 B2 * | 7/2015 | Willig | H04W 24/06 |
| 9,400,192 B1 | 7/2016 | Salser, Jr. et al. | |
| 9,438,492 B2 | 9/2016 | Indovina et al. | |
| 9,801,541 B2 * | 10/2017 | Mensinger | A61B 5/1486 |
| 2002/0109607 A1 | 8/2002 | Cumeralto et al. | |
| 2002/0193144 A1 | 12/2002 | Belski et al. | |
| 2003/0035405 A1 | 2/2003 | Nagatani et al. | |
| 2008/0158007 A1 * | 7/2008 | Nagy | G07F 15/00 |
| | | | 340/870.03 |
| 2015/0227150 A1 | 8/2015 | Chamarti et al. | |
| 2015/0277465 A1 | 10/2015 | Deligiannis et al. | |
| 2015/0373149 A1 | 12/2015 | Lyons | |
| 2017/0134182 A1 | 5/2017 | Davis et al. | |
| 2018/0278091 A1 | 9/2018 | Fukasawa et al. | |
| 2019/0249895 A1 | 8/2019 | Weyant et al. | |

\* cited by examiner

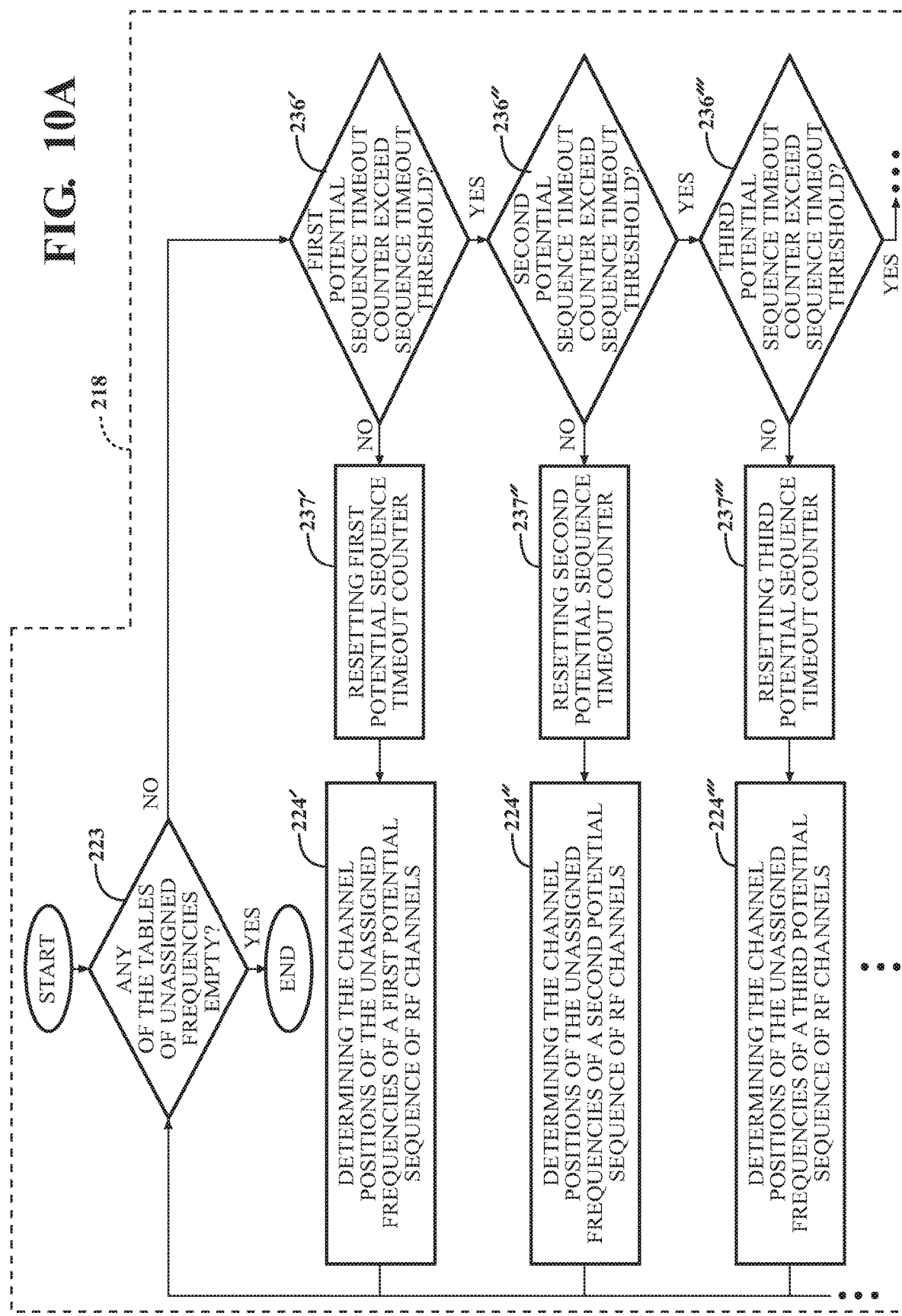

SYSTEMS AND METHODS OF CAPTURING USAGE DATA FROM AN AMR DEVICE

CROSS-REFERENCE TO RELATED APPLICATIONS

The present application is the National Stage of International Patent Application No. PCT/US2019/013250, filed on Jan. 11, 2019, which claims priority to and all of the benefits of U.S. Provisional Patent Application No. 62/616,680, filed on Jan. 12, 2018, which are hereby expressly incorporated herein by reference in their entirety.

FIELD OF THE DISCLOSURE

The present invention relates generally to methods of capturing usage data of a usage area and, more particularly, to a method of capturing usage data of a usage area from an automatic meter reading (AMR) device.

DESCRIPTION OF THE RELATED ART

Conventionally, automatic meter reading (AMR) devices broadcast usage data by using a frequency-hopping spread spectrum (FHSS) signal. These FHSS signals allow AMR devices to broadcast usage data on a variety of radio-frequency (RF) channels over a wide band of frequencies as a function of time. In this way, AMR devices are able to reduce interference from interfering signals, as interfering signals will only affect the FHSS signal if both signals are transmitting at the same frequency and at the same time.

While AMR devices broadcast usage data over a wide band of frequencies, it is generally advantageous to capture the usage data using a narrowband RF receiver, as opposed to a wideband RF receiver, as narrowband RF receivers require less energy to operate and are more efficient. Conventionally, wideband AMR devices simultaneously receive incoming signals from the entire wide band of frequencies, a process that is expensive and hardware-intensive.

As a result, however, narrowband RF receivers capture usage data using a synchronization process, which configures the narrowband RF receiver to receive the usage data at a specific frequency and at a specific time. In a conventional synchronization process, a narrowband RF receiver scans through the entire wide band of frequencies and listens for a predetermined "preamble" in the incoming signals. Once the narrowband RF receiver receives the predetermined "preamble" from an incoming signal, the narrowband RF receiver retrieves the usage data from the rest of the incoming signal. Unfortunately, however, some AMR devices in the art do not send a "preamble", forcing narrowband RF receivers to use other techniques to capture usage data.

As such, there are opportunities to address the aforementioned problems.

SUMMARY OF THE DISCLOSURE AND ADVANTAGES

A method of capturing usage data of a usage area, which includes an automatic meter reading device that broadcasts the usage data over a sequence of radio-frequency (RF) channels via a frequency-hopping spread spectrum (FHSS) signal is provided. The method includes the steps of providing an RF receiver for the usage area, determining the sequence of RF channels, and receiving the usage data by tuning the RF receiver to an RF channel based on the sequence of RF channels. The sequence of RF channels includes an array of RF channels assigned to and ordered based on a channel position. Advantageously, the method provides a hardware-efficient and energy-efficient solution to capture the usage data of a usage area using a narrowband RF receiver.

BRIEF DESCRIPTION OF THE SEVERAL VIEWS OF THE DRAWINGS

Other advantages of the present disclosure will be readily appreciated, as the same becomes better understood by reference to the following detailed description when considered in connection with the accompanying drawings wherein:

FIG. 10A is a flowchart illustrating a step of determining channel positions of unassigned frequencies of each of the potential sequences of RF channels.

Figure 1:
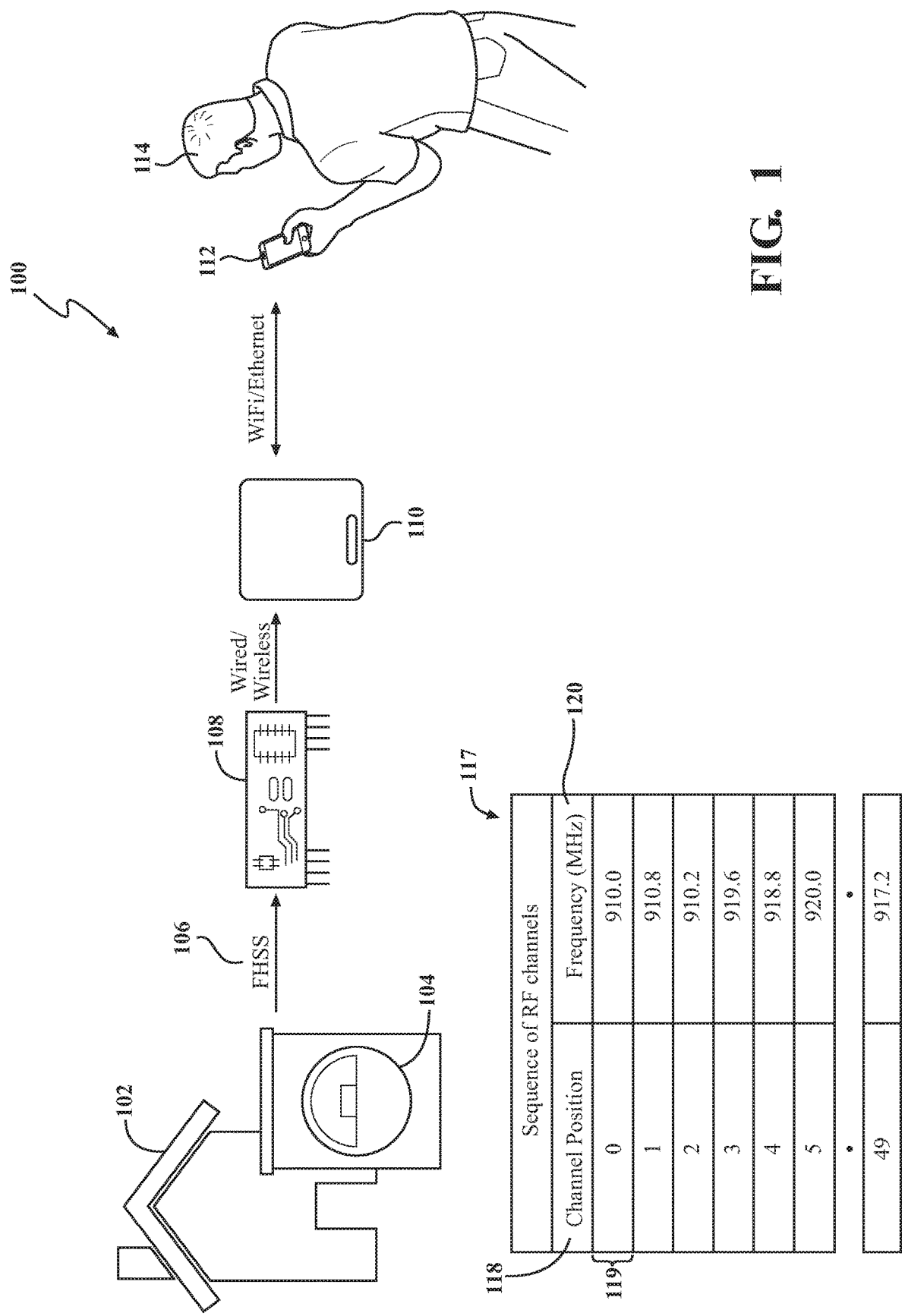
FIG. 1 is a diagrammatic view of one embodiment of a system for capturing usage data of a usage area including an automatic meter reading (AMR) device.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in commercially feasible embodiments are often not depicted in order to facilitate a less obstructed view of these various embodiments of the present invention.

DETAILED DESCRIPTION OF THE DISCLOSURE

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one instance", "an instance", "one example" or "an example" means that a particular feature, structure or characteristic described in connection with the embodiment, instance, or example is included in at least one embodiment of the present invention. Thus, appearances of the phrases "one embodiment", "an embodiment", "one instance", "an instance", "one example" or "an example" in various places throughout this specification are not necessarily all referring to the same embodiment, instance, or example. Furthermore, the particular features, structures or characteristics may be combined in any suitable combinations and/or sub-combinations in one or more embodiments, instances, or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that may be rapidly provisioned via virtualization and released with minimal management effort or service provider interaction, and then scaled accordingly. A cloud model may be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which may include one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, to be interpreted to include, without limitation, wired and wireless communication using any one or a plurality of suitable protocols, as well as communication methods that are constantly maintained, are made on a periodic basis, and/or are made or initiated on an as needed basis.

I. System Overview

Referring to the figures, wherein like numerals indicate like or corresponding parts throughout the several views, a system 100 for capturing usage data of a usage area 102 including an automatic meter reading (AMR) device 104 is provided in FIG. 1.

In the system 100 and method 200 disclosed herein, a usage area 102 may be defined as any area which utilizes energy. For example, a building may be an example of a usage area 102. In some instances of this invention, usage areas 102 may even be defined as wings or floors of buildings. Example usage areas 102 include, but are not limited to, homes, factories, hospitals, and other workplaces. The words "usage area" and "home" may be used interchangeably herein and should thus not be construed as limiting. Additionally, the usage data may comprise at least one of an electrical energy consumption of the usage area 102, a gas usage of the usage area 102, and a water consumption of the usage area 102.

The user 114 as referred to herein may be defined as any individual or individuals who occupy and/or use the usage area 102 or any individual or individuals who manage and/or control energy usage within the usage area 102. Some suitable, non-limiting examples of the user 114 are residents and employees who utilize usage areas 102 such as homes or workplaces. As a residential example, the user 114 may be a homeowner or family member of the homeowner who resides in a home. As another example, the user 114 may be a family of five residents who reside in a home. As workplace examples, the user 114 may be a maintenance manager in a factory, an office manager in an office building, or a department manager in a hospital (i.e., a usage area 102). As yet another example, the user 114 may be a business owner/restaurateur who owns a restaurant. Other suitable, non-limiting examples of the user 114 are individuals who manage the usage area 102 and the activities and/or energy usage therein, but who are not regularly in the usage area 102. For example, the user 114 may be a maintenance technician of an apartment complex.

Referring to FIG. 1, the usage area 102 includes the AMR device 104, which is configured to broadcast the usage data over a sequence of radio-frequency (RF) channels 117 via a frequency-hopping spread spectrum (FHSS) signal 106. FHSS signals allow the AMR device 104 to broadcast usage data on a variety of radio-frequency (RF) channels 119 as a function of time. A table representing an example sequence of RF channels 117, corresponding to the AMR device 104, is shown in FIG. 1. As shown, the AMR device 104 broadcasts the usage data on an RF channel 119, which includes a frequency 120 and a channel position 118, by transmitting the usage data using the frequency 120 and in accordance with the channel position 118 of the RF channel 119. For instance, the AMR device 104 corresponding to the example sequence of RF channels 117 shown in FIG. 1 will first transmit the usage data using a 910.0 MHz signal at channel position 0, the AMR device 104 will then transmit the usage data using a 910.8 MHz signal at channel position 1, and so forth until the AMR device 104 transmits the usage data using a 917.2 MHz signal at channel position 49. Afterwards, the AMR device 104 restarts the sequence of RF channels 117 by broadcasting the usage data using the 910.0 MHz signal at channel position 0.

The system 100 also includes an RF receiver 108 configured to receive the usage data from the AMR device 104, a gateway device 110 coupled to the RF receiver 108 and configured to receive the usage data from the AMR device 104, and a user computing device 112 coupled to the gateway device 110 and configured to present the usage data to the user 114. The gateway device 110 may be coupled to the user computing device 112 using a variety of methods. For instance, the gateway device 110 may be directly coupled to the user computing device 112. In one such instance, the gateway device 110 may be coupled to the user computing device 112 via a Bluetooth connection. In other instances, the gateway device 110 may be coupled to the user computing device 112 via another device. For example, a WiFi router may be coupled to both the gateway device 110 and the user computing device 112 via a WiFi connection. In such an instance, the gateway device 110 may be coupled to the user computing device 112 via the WiFi router.

Figure 2:
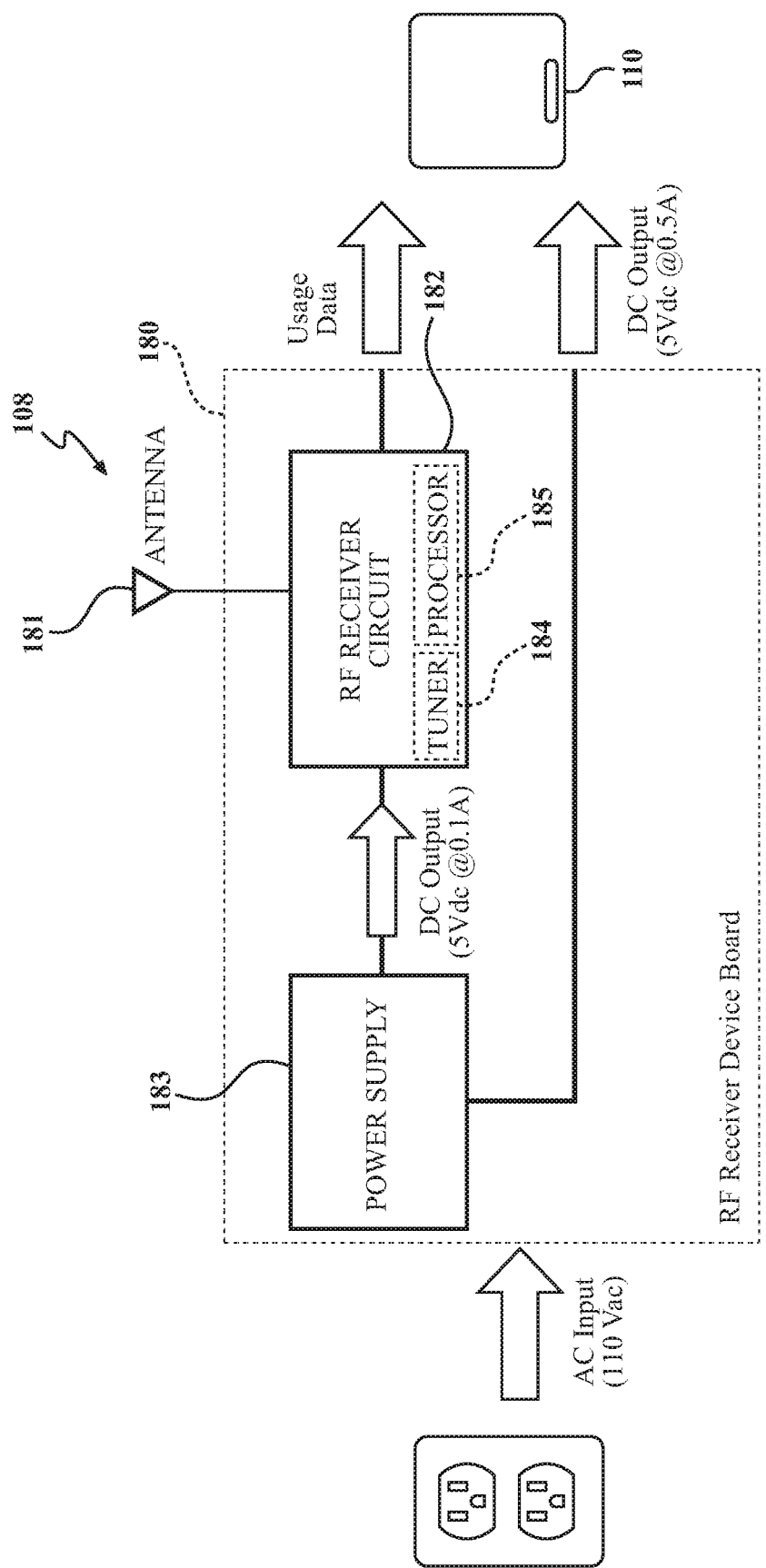
FIG. 2 is a block diagram of an RF receiver.

The RF receiver 108 is further illustrated in FIG. 2. As shown, the RF receiver 108 may be configured to receive power from an alternating current (AC) energy source, such as a wall socket of a home, as shown in FIG. 2. In the instance shown in FIG. 2, the RF receiver 108 receives $110V_{ac}$ (AC volts) from a wall socket of the usage area 102. However, in other instances, the RF receiver 108 may receive a different amount of voltage from a different energy source.

Also shown, the RF receiver 108 may include an antenna 181 configured to receive the usage data from the AMR device 104 by receiving RF signals within a frequency bandwidth. Furthermore, the RF receiver 108 may include an RF receiver circuit 182 coupled to the antenna 181, which may include a tuner 184 configured to tune the RF receiver 108 to receive RF signals within any suitable RF band. For example, in an instance where the AMR device 104 broadcasts the usage data at a frequency between 900 MHz and 930 MHz, the tuner 184 may tune the antenna 181 between 900-930 MHz RF band to receive the usage data. For instance, the tuner 184 may tune the antenna 181 between 900-930 MHz based on the sequence of RF channels 117. In instances where the AMR device 104 broadcasts the usage data at a different frequency range, the antenna 181 may be similarly tuned to receive RF signals in the different frequency range.

The RF receiver circuit 182 coupled to the antenna 181 may also include a processor 185. The processor 185 may be configured to determine the sequence of RF channels 117 in order to determine the usage data. After the RF receiver 108 determines the usage data, the usage data may be transmitted to the gateway device 110, as shown in FIG. 2.

The processor 185 may be any processor suitable for processing data. For example, the processor 185 may be a processor typically found in a desktop computer or a processor typically found in a mobile processing device such as a cellular phone, a tablet, or a laptop. Additionally, the RF receiver 108 may include a memory (not shown). The memory may be any memory suitable for storage of data and computer-readable instructions. For example, the memory may be a local memory, an external memory, or a cloud-based memory embodied as random access memory (RAM), non-volatile RAM (NVRAM), flash memory, or any other suitable form of memory.

Furthermore, the RF receiver 108 may include a power supply 183 coupled to the RF receiver circuit 182 and to the gateway device 110. The power supply 183 may be configured to provide power to the RF receiver circuit 182 and to the gateway device 110. As shown in FIG. 2, the power supply 183 provides a direct current (DC) voltage to the RF receiver circuit 182 and to the gateway device 110 of $5V_{dc}$ at a current of 0.6 A. However, in other instances, the power supply 183 may provide a different amount of voltage at a different electrical current to the RF receiver circuit 182 and/or to the gateway device 110.

It should be noted that the RF receiver 108 may provide power and transmit the usage data to the gateway device 110 using a single wired connection. For example, in some instances, the RF receiver 108 may be coupled to the gateway device 110 using a USB cable, such as a micro USB cable. In other instances, the RF receiver 108 may be coupled to the gateway device 110 using any other connection that provides data communication and power supply.

Additionally, as shown in FIG. 1, the system 100 may include the gateway device 110. The gateway device 110 employs a combination of custom hardware and software to receive the usage data from the AMR device 104 and to provide the user computing device 112 of the user 114 with the usage data transmitted by the AMR device 104. It should be appreciated that the gateway device 110 may be the gateway device 110 disclosed in U.S. Provisional Application No. 62/470,662. Furthermore, in some instances, the gateway device 110 may be a commercially available device, such as a Powerley Energy Bridge available from Insight Energy Ventures.

As shown in FIG. 1, the gateway device 110 may be coupled to the RF receiver 108, allowing the gateway device 110 to receive the usage data from the AMR device 104. It should be noted that the gateway device 110 may be coupled to the RF receiver 108 using a variety of methods. In some instances, the gateway device 110 may be wirelessly coupled to the RF receiver 108 using ZigBee Smart Energy Profile, WiFi, Bluetooth, Thread, Z-Wave, or any other suitable wireless communication protocol. In other instances, the gateway device 110 may also be coupled to the RF receiver 108 using a wired connection such as Ethernet, USB, or any other suitable wired communication protocol. For example, the RF receiver 108 may be coupled to the gateway device 110 via a USB cable to provide usage data and power to the gateway device 110.

Furthermore, as shown in FIG. 1, the gateway device 110 may be coupled to the user computing device 112 of the user 114, allowing the gateway device 110 to provide the user computing device 112 with the usage data transmitted by the AMR device 104. The user computing device 112 disclosed herein may be embodied as a mobile device such as a desktop computer or another computing device such as a mobile phone, tablet computer, smartphone, or any other suitable computing device. In some instances, the user computing device 112 may be a plurality of user computing devices 112. In such instances, the gateway device 110 may provide the plurality of user computing devices 112 with the usage data transmitted by the AMR device 104.

As shown, the gateway device 110 may be coupled to the user computing device 112 using WiFi, Ethernet, or a combination thereof. In some instances, the gateway device 110 may be connected to the user computing device 112 through the use of a WiFi router. In other instances, the gateway device 110 may be connected to a server that the user computing device 112 has access to, via WiFi or Ethernet. In this way, the user computing device 112 may receive the usage data of the usage area 102 from the gateway device 110 via the server.

II. Method Overview

Figures 3, 4:
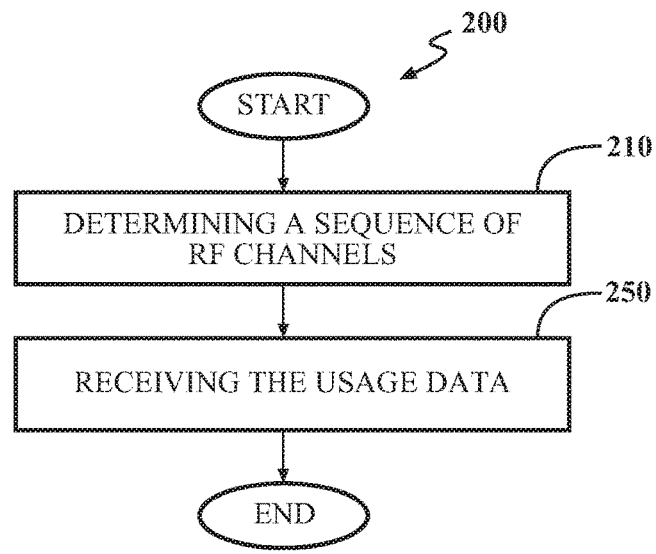
FIG. 3 is a flowchart illustrating a method of capturing the usage data of the usage area.
FIG. 4 is a table diagram illustrating one embodiment of a sequence of RF channels.

A flowchart in FIG. 3 illustrates a method 200 of capturing the usage data of the usage area 102. In an instance of the method 200, the usage area 102 may include the AMR device 104 and may be provided with the RF receiver 108. Furthermore, the AMR device 104 may be configured to broadcast the usage data over the sequence of RF channels 117 via the FHSS signal 106.

FIG. 4 illustrates an example instance of the sequence of RF channels 117. As shown, each RF channel 119 of the sequence of RF channels 117 includes a frequency 120 and a channel position 118, the RF channels 119 being sequenced based on the channel position 118. The AMR device 104 corresponding to the sequence of RF channels 117 is configured to broadcast the usage data using 50 different frequencies 120. For example, the AMR device 104 is configured to broadcast the usage data using a 910.0 MHz signal at channel position 0. Afterwards, the AMR device 104 broadcasts the usage data using a 910.8 MHz signal at channel position 1. Ultimately, the AMR device 104 broadcasts the usage data using a 920.6 MHz signal at channel position 49 before repeating the sequence of RF channels 117, once again broadcasting the usage data using a 910.0 MHz signal at channel position 0.

While the sequence of RF channels 117 in FIG. 4 includes a total of 50 RF channels 119, the sequence of RF channels 117 may include more or less RF channels 119 depending on a configuration of the AMR device 104. Additionally, while the example sequence of RF channels 117 in FIG. 4 includes the frequencies between a 900-930 MHz RF band, the sequence of RF channels 117 may include a variety of other, suitable, frequencies, depending on the configuration of the AMR device 104. For example, the frequencies may be between any other suitable RF bands, which the AMR device 104 may use to broadcast the usage data. Furthermore, while the frequencies 120 are multiples of 200 kHz, in other instances, the frequencies 120 may be multiples of 25 kHz, 50 kHz, 150 kHz, 200 kHz, or any other suitable increment.

For each RF channel 119, the AMR device 104 may be configured to broadcast the usage data using the frequency 120 of the RF channel 119 once during a predetermined period of time. This predetermined period of time is referred to herein as a bubble-up time 141. For example, in the instance shown in FIG. 4, the bubble-up time 141 for each RF channel 119 is 60 seconds. As such, for each RF channel 119, the AMR device 104 is configured to broadcast the usage data using the frequency 120 of the RF channel 119 once every 60 seconds. However, in other instances, the AMR device 104 may be configured to broadcast the usage data using any suitable bubble-up time 141. For example, the AMR device 104 may be configured to broadcast the usage data once during a bubble-up time 141 of 15 seconds, 30 seconds, 60 seconds, 90 seconds, or any other suitable amount of time. In some instances, the AMR device 104 may be configured to broadcast the usage data more than once during each bubble-up time 141.

Referring back to FIG. 3, the method 200 of capturing the usage data of the usage area 102 includes a step 210 of determining, with the processor 185, the sequence of RF channels 117. The method 200 also includes a step 250 of receiving, with the antenna 181, the usage data by tuning the RF receiver 108, with the tuner 184, to a frequency 120 based on the sequence of RF channels 117.

III. Determining the Sequence of RF Channels

During step 210, the step of determining the sequence of RF channels 117, the RF receiver 108 populates a table representing the sequence of RF channels 117 by assigning frequencies 120 to channel positions 118 in the table representing the sequence of RF channels 117. By populating a table representing the sequence of RF channels 117, the RF receiver 108 determines the sequence of RF channels 117 and, furthermore, how the AMR device 104 is configured to broadcast the usage data.

Figure 5A:
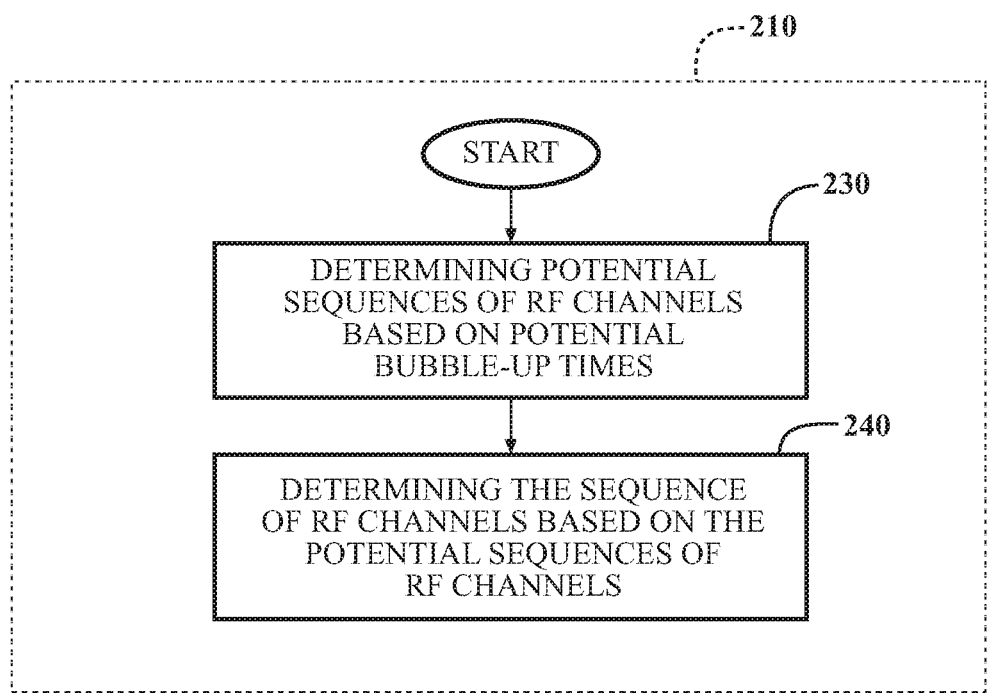
FIG. 5A is a flowchart illustrating a step of determining the sequence of RF channels.

FIG. 5A further illustrates step 210. As shown, step 210 includes a step 230 of determining potential sequences of RF channels 116 based on potential bubble-up times 142; and a step 240 of determining the sequence of RF channels 117 based on the potential sequences of RF channels 116. Step 230 and step 240 may be executed by the processor 185.

Generally stated, the potential sequences of RF channels 116 serve as "rough drafts" of the sequence of RF channels 117. As such, the potential sequence of RF channels 116 includes RF channels 119, which include a frequency 120 and a channel position 118. Furthermore, the RF channels 119 of the potential sequences of RF channels 116 are also sequenced based on the channel position 118. During step 240, a sequence of RF channels 117 is chosen from the potential sequences of RF channels 116 to represent how the AMR device 104 is configured to broadcast the usage data.

Furthermore, the potential sequences of RF channels 116 are determined based on potential bubble-up times 142. As previously stated, the AMR device 104 may be configured to broadcast the usage data during a bubble-up time 141. However, in instances where the bubble-up time 141 is unknown to the RF receiver 108, the potential sequences of RF channels 116 are generated during step 230 based on various potential bubble-up times 142. For example, the potential bubble-up times 142 may include 60 seconds, 30 seconds, and 15 seconds. As such, during step 230, potential sequences of RF channels 116 may be determined based on the 60 second potential bubble-up time, the 30 second potential bubble-up time, and the 15 second potential bubble-up time. In this way, when the sequence of RF channels 117 is chosen from the potential sequences of RF channels 116 during step 240, the potential bubble-up time 142 used to generate the potential sequence of RF channels 116 is chosen to represent the bubble-up time 141 of the AMR device 104.

Figure 5B:
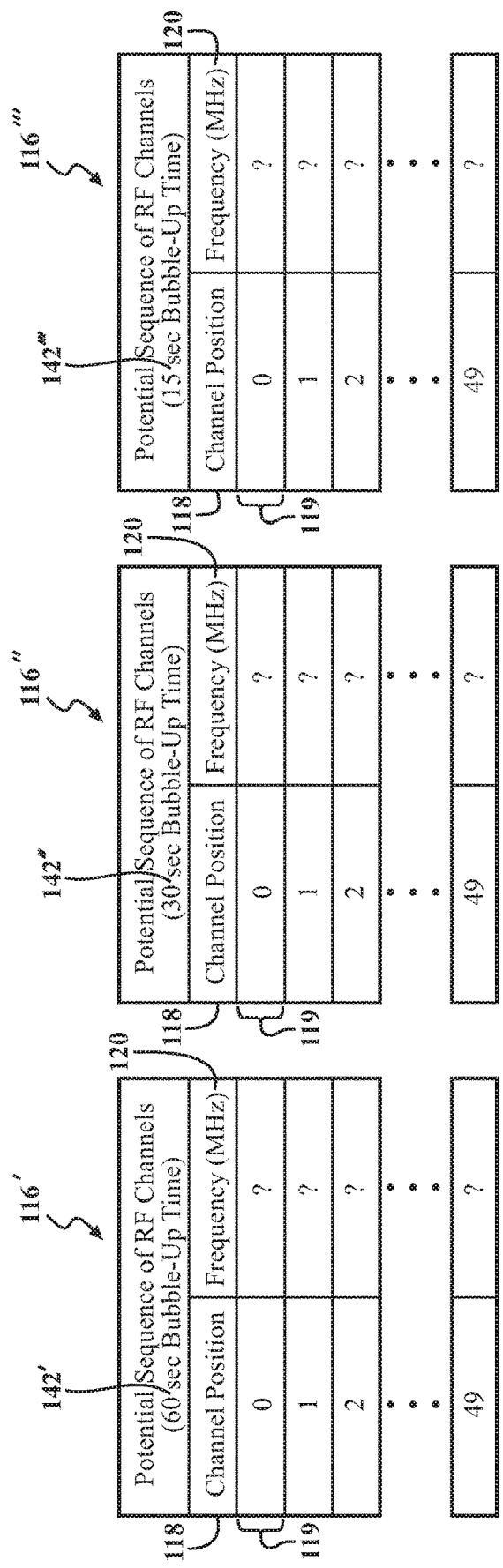
FIG. 5B is a table diagram illustrating unpopulated potential sequences of RF channels.

FIG. 5B illustrates an example instance of the potential sequences of RF channels 116, where the potential sequences of RF channels 116 are initially unpopulated. In FIG. 5B, the potential bubble-up times 142 are 60 seconds, 30 seconds, and 15 seconds. As such, three potential sequences of RF channels 116 are shown: a potential sequence of RF channels 116' with a 60 second potential bubble-up time 142', a potential sequence of RF channels 116" with a 30 second potential bubble-up time 142", and a potential sequence of RF channels 116' with a 15 second potential bubble-up time 142'. Similar to the sequence of RF channels 117 shown in FIGS. 1 and 4, each of the three potential sequences of RF channels 116', 116", 116''' includes 50 RF channels 119, each of which include a frequency 120 and are sequenced by channel position 118. However, because the three potential sequences of RF channels 116', 116", 116''' are determined based on different potential bubble-up times 142', 142", 142''', the frequencies 120 may be assigned to different channel positions 180 in each potential sequence of RF channels 116', 116", 116'''.

It should be noted that, just as the bubble-up time 141 of the AMR device 104 may be any suitable amount of time, the potential bubble-up times 142 may also be any suitable amount of time. Additionally, there may be any suitable number of potential bubble-up times 142, and therefore, any suitable number of potential sequences of RF channels 116. For example, the potential bubble-up times 142 may include 10 seconds, 20 seconds, 31 seconds, 55 seconds, 71.5 seconds, etc. Accordingly, a potential sequence of RF channels 116 may be determined for each potential bubble-up time 142. Furthermore, the bubble-up times 142 may be programmed into the RF receiver 108 and/or determined during the method 200.

Figure 6:
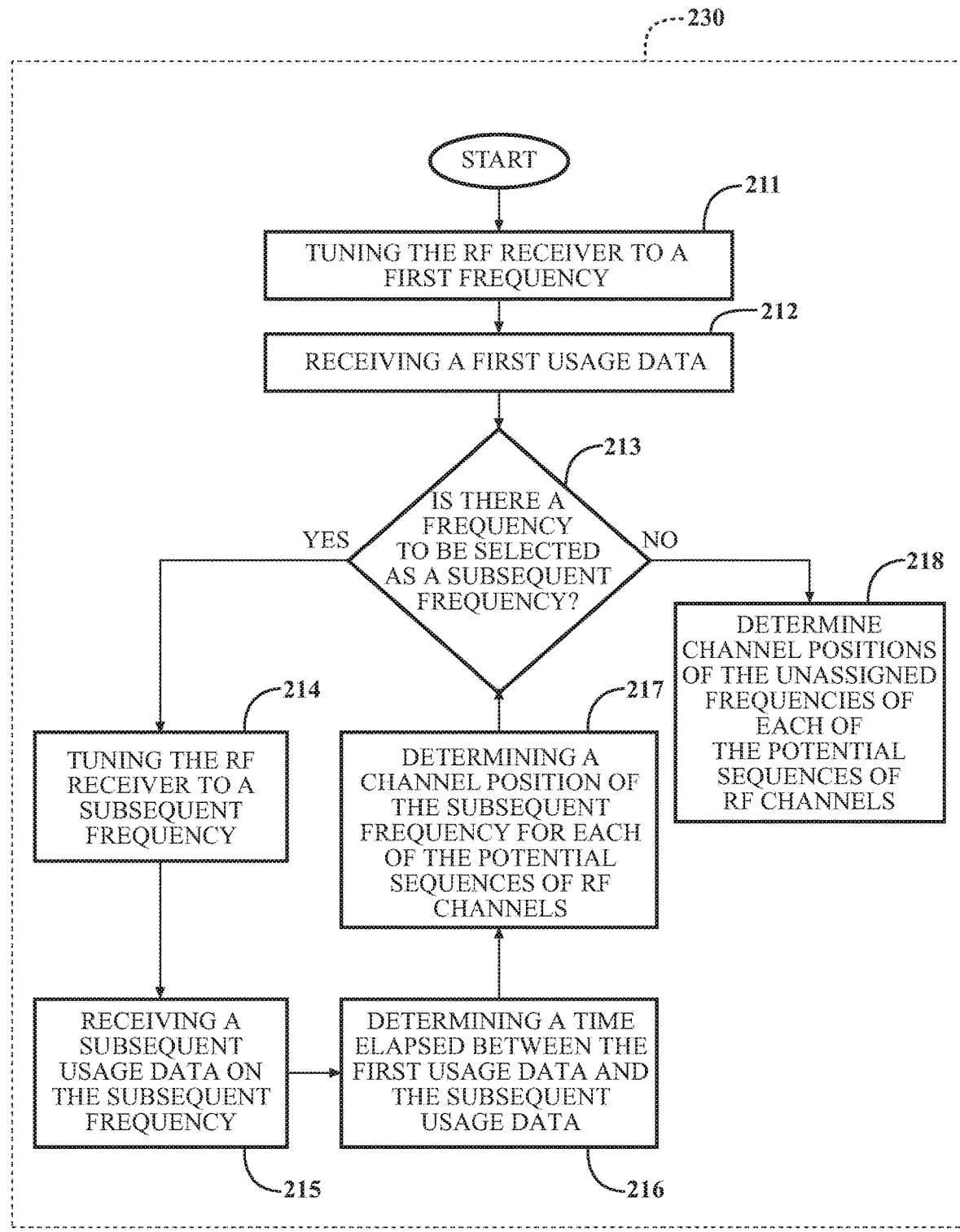
FIG. 6 is a flowchart illustrating a step of determining the potential sequences of RF channels.

FIG. 6 further illustrates the step 230 of determining the potential sequences of RF channels 117 based on potential bubble-up times 142. As shown, step 230 includes a step 211 of tuning, with the tuner 184, the RF receiver 108 to a first frequency 121; a step 212 of receiving, with the antenna 181, a first usage data; a step 214 of tuning, with the tuner 184, the RF receiver 108 to a subsequent frequency 122; a step 215 of receiving, with the antenna 181, a subsequent usage data on the subsequent frequency 122; a step 216 of determining, with the processor 185, a time elapsed 131 between reception of the first usage data and reception of the subsequent usage data; a step 217 of determining, with the processor 185, the channel position 118 of the subsequent frequency 122 for each of the potential sequences of RF channels 116 based on the time elapsed 131 between the first usage data and the subsequent usage data; and a step 218 of determining, with the processor 185, channel positions 118 of unassigned frequencies 170 of each of the potential sequences of RF channels 116.

Figure 7A:
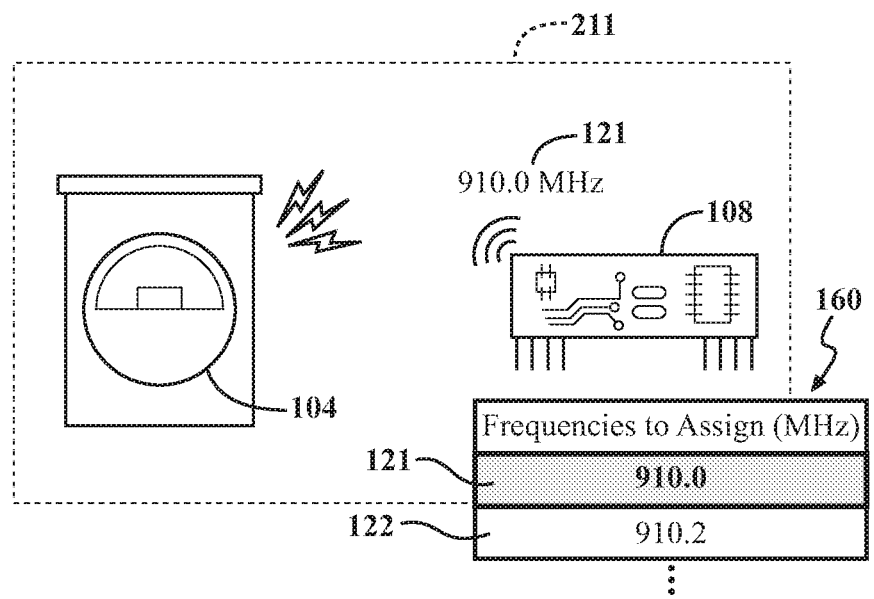
FIG. 7A is a diagrammatic view of a step of tuning the RF receiver to a first frequency.

FIG. 7A further illustrates step 211, the step of tuning the RF receiver 108 to the first frequency 121. As shown, the RF receiver 108 is tuned to the first frequency 121 of 910.0 MHz, allowing the RF receiver 108 to receive signals being transmitted at 910.0 MHz. Therefore, once the AMR device 104 transmits the usage data using a 910.0 MHz signal, the RF receiver 108 may receive the 910.0 MHz signal and, therefore, the usage data.

Furthermore, in the instance shown in FIG. 7A, the RF receiver 108 determines the first frequency 121 using a table of frequencies to assign 160. The table of frequencies to assign 160 is defined as a table including possible frequencies that the AMR device 104 may use to broadcast the usage data. In FIG. 7A, a frequency of 910.0 MHz is selected from the table of frequencies to assign 160 as the first frequency 121. Of course, in other instances, the first frequency 121 may be any frequency from the table of frequencies to assign 160. Subsequently, after 910.0 MHz is assigned as the first frequency 121, 910.0 MHz is removed from the table of frequencies to assign 160.

It should be noted that, during step 211 or any step herein that involves tuning the RF receiver 108, the RF receiver 108 may be tuned to a frequency 120 and the RF receiver 108 may receive signals within a frequency bandwidth of the frequency 120. In some instances, the frequency bandwidth of the frequency 120 may be between 80 kHz and 800 kHz. For example, in one instance, the RF receiver may be tuned to receive signals within a 100 kHz frequency bandwidth of a 910.0 MHz signal. In such an instance, the RF receiver 108 may receive signals being transmitted at any frequency between 909.95 MHz and 910.05 MHz. In this way, the frequency bandwidth provides a resolution by which the RF receiver 108 may receive signals.

Additionally, the frequency bandwidth of the RF receiver 108 may be selected based on a configuration of the AMR device 104. As previously discussed, the AMR device 104 may be configured to broadcast the usage data using signals of a variety of frequencies 120. For example, the AMR device 104 may be configured to broadcast the usage data using frequencies 120 separated by 25 kHz, 50 kHz, 150 kHz, 200 kHz, or any other suitable increment. As such, the frequency bandwidth of the RF receiver 108 may be selected based on the increment. For instance, if the frequencies 120 used by the AMR device 104 are separated by at least 200 kHz, the frequency bandwidth may be less than or equal to 200 kHz. In this way, the RF receiver 108 may receive the usage data once per frequency 120 during a single iteration of the sequence of RF channels 117. In instances disclosed herein, the frequencies 120 are separated by 200 kHz and the frequency bandwidth is selected to be 100 kHz. However, it is to be appreciated that, in other instances, the frequencies 120 may be separated by a different frequency increment and that the frequency bandwidth may be any frequency between 80 kHz and 800 kHz.

Figure 7B:
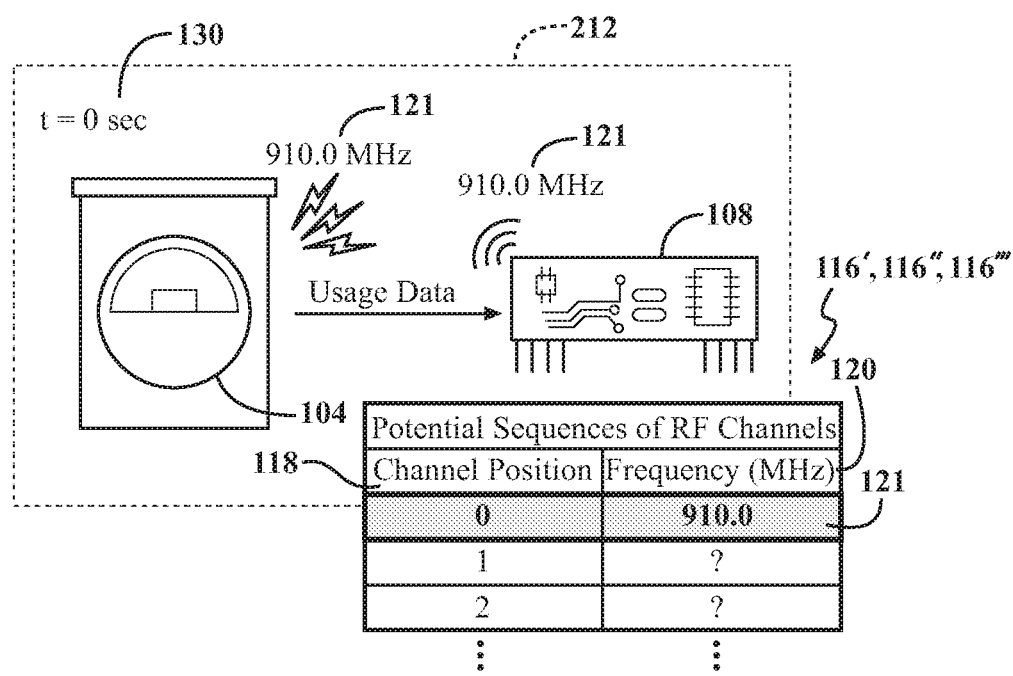
FIG. 7B is a diagrammatic view of a step of receiving a first usage data.

FIG. 7B further illustrates step 212, the step of receiving a first usage data. As shown, during step 212, the AMR device 104 transmits the first usage data using the first frequency 121, 910.0 MHz. As such, the RF receiver 108 may receive the first usage data from the AMR device 104. After receiving the first usage data, the first frequency 121 may be assigned to a first channel position 118, channel position "0", in each potential sequence of RF channels 116', 116", 116'". After receiving the first usage data, the RF receiver 108 may record an initial time stamp 130, represented using "t=0 sec". In some instances, the initial time stamp 130 may be based on a clock internal to the RF receiver 108, such as a system clock of the RF receiver 108. In other instances, the initial time stamp 130 may be based on a clock external to the RF receiver 108, to which the RF receiver 108 may refer in order to determine the initial time stamp 130.

After step 212, the method 200 proceeds to a step 213 (shown in FIG. 6) of determining whether the table of frequencies to assign 160 includes a frequency to be selected as the subsequent frequency 122. As previously stated, the first frequency 121 is selected and removed from the table of frequencies to assign 160 during step 211. Similarly, after a subsequent frequency 122 is selected from the table of frequencies to assign 160, the subsequent frequency 122 is removed from the table of frequencies to assign 160. Therefore, once all of the frequencies 120 in the table of frequencies to assign 160 have been selected and removed, the frequencies to assign table 160 will be empty and there will no longer be a frequency to be selected as the subsequent frequency 122. Accordingly, if it is determined, during step 213, that the table of frequencies to assign 160 is not empty, the method 200 proceeds to the step 214 of tuning the RF receiver 108 to the subsequent frequency 122 during step 214.

Figure 7C:
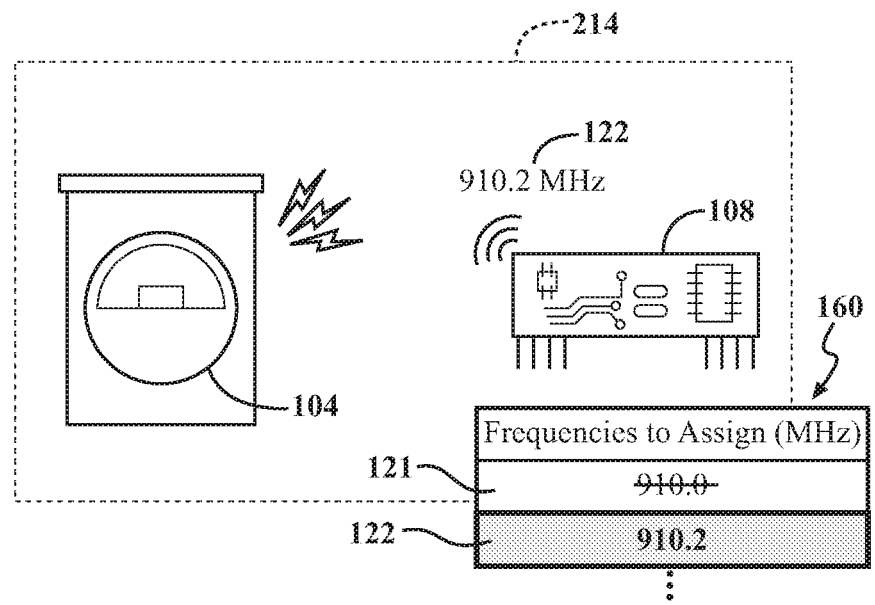
FIG. 7C is a diagrammatic view of a step of tuning the RF receiver to a subsequent frequency.

FIG. 7C further illustrates step 214, the step of tuning the RF receiver 108 to the subsequent frequency 122. In the instance of FIG. 7C, a frequency of 910.2 MHz is selected from the table of frequencies to assign 160 as the subsequent frequency 122. As follows, the RF receiver 108 is tuned to the subsequent frequency 122 of 910.2 MHz, allowing the RF receiver 108 to receive signals being transmitted at 910.2 MHz. Of course, in other instances, the subsequent frequency 122 may be any frequency in the table of frequencies to assign 160.

Figure 7D:
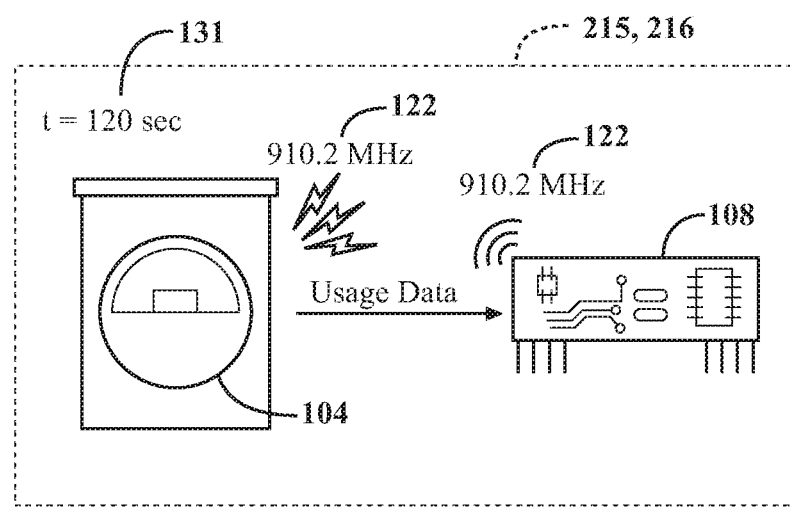
FIG. 7D is a diagrammatic view of steps of receiving a subsequent usage data on the subsequent frequency and determining a time elapsed between receiving the first usage data and receiving the subsequent usage data.

FIG. 7D further illustrates step 215, the step of receiving the subsequent usage data, and step 216, the step of determining the time elapsed 131 between the first usage data and the subsequent usage data. As shown, the AMR device 104 transmits the subsequent usage data at the subsequent frequency 122, 910.2 MHz, and the RF receiver 108 receives the subsequent usage data from the AMR device 104. After receiving the subsequent usage data, the RF receiver 108 may record the time elapsed 131 between reception of the first usage data and reception of the subsequent usage data. In the instance shown in FIG. 7D, the time elapsed 131 is 120 seconds, represented using "t=120 sec". Similar to the initial time stamp 130, the time elapsed 131 may be based on a clock internal to the RF receiver 108, such as a system clock of the RF receiver 108, or a clock external to the RF receiver 108.

Figure 8:
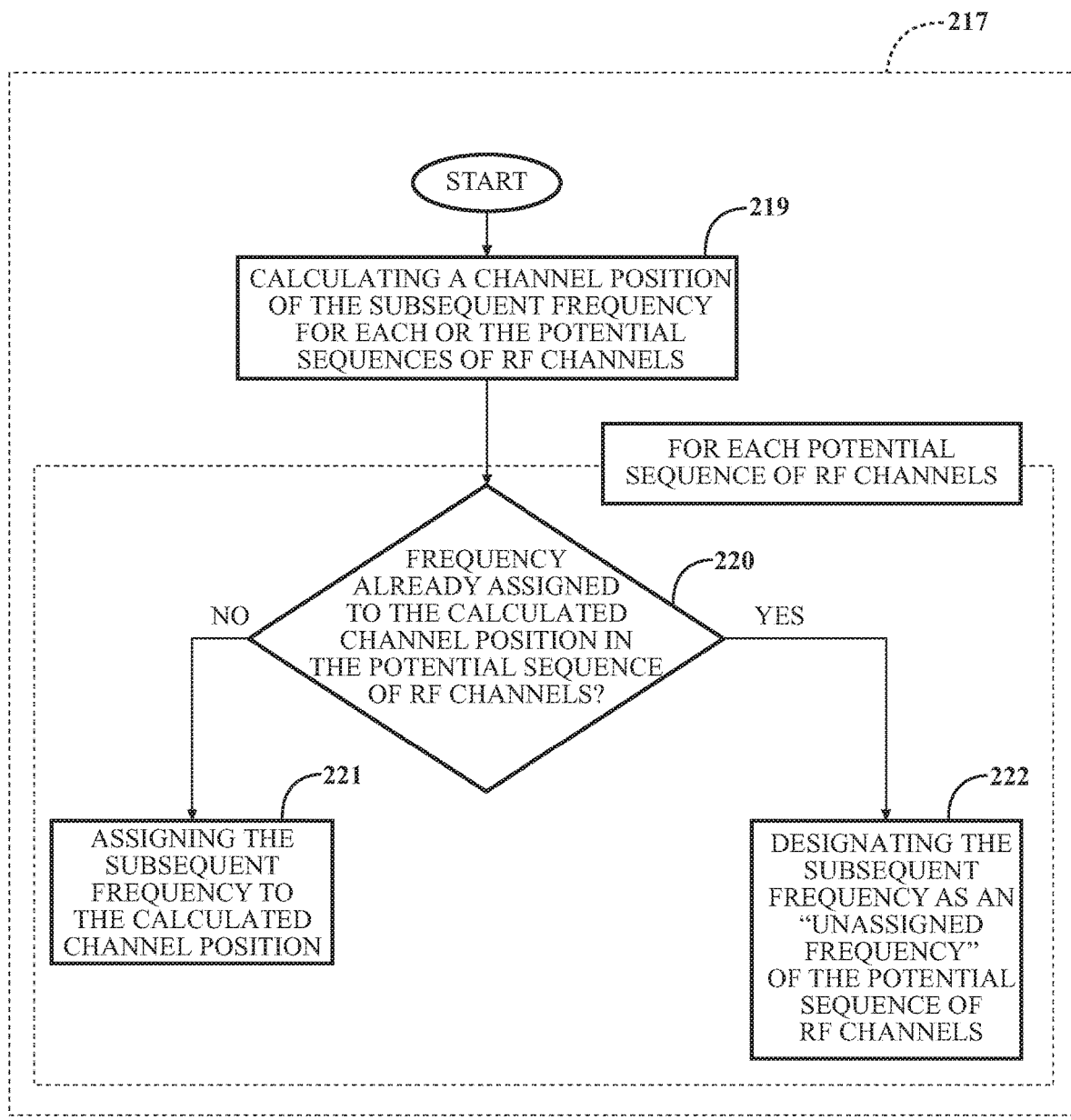
FIG. 8 is a flowchart illustrating a step of determining a channel position of the subsequent frequency for each of the potential sequences of RF channels.

Referring back to FIG. 6, after step 216, the method 200 proceeds to step 217, the step of determining the channel position 118 of the subsequent frequency 122 for each of the potential sequences of RF channels 116 based on the time elapsed 131. FIG. 8 provides a flowchart further illustrating step 217. As shown, step 217 includes a step 219 of calculating, with the processor 185, the channel position 118 of the subsequent frequency 122 to produce a calculated channel position 150 for each of the potential sequences of RF channels 116; a step 220 of determining, with the processor 185, whether a frequency 120 is already assigned to the calculated channel position 150 in a potential sequence of RF channels 116; a step 221 of assigning, with the processor 185, the subsequent frequency 122 to the calculated channel position 150 in the potential sequence of RF channels 116 in response to step 220; and a step 222 of designating, with the processor 185, the subsequent frequency 122 as an unassigned frequency 170 of the potential sequence of RF channels 116 in response to step 220.

It should be appreciated that, during each instance of step 217, steps 220, 221, and 222 may be repeated to determine the channel position 118 of the subsequent frequency 122 for each of the potential sequences of RF channels 116, as noted in FIG. 8. For example, in the above-stated example, steps 220, 221, and 222 are repeated three times during an iteration of step 217 to determine the channel position 118 of the subsequent frequency 122 for the potential sequence of RF channels 116', the potential sequence of RF channels 116", and the potential sequence of RF channels 116'".

Figure 9A:
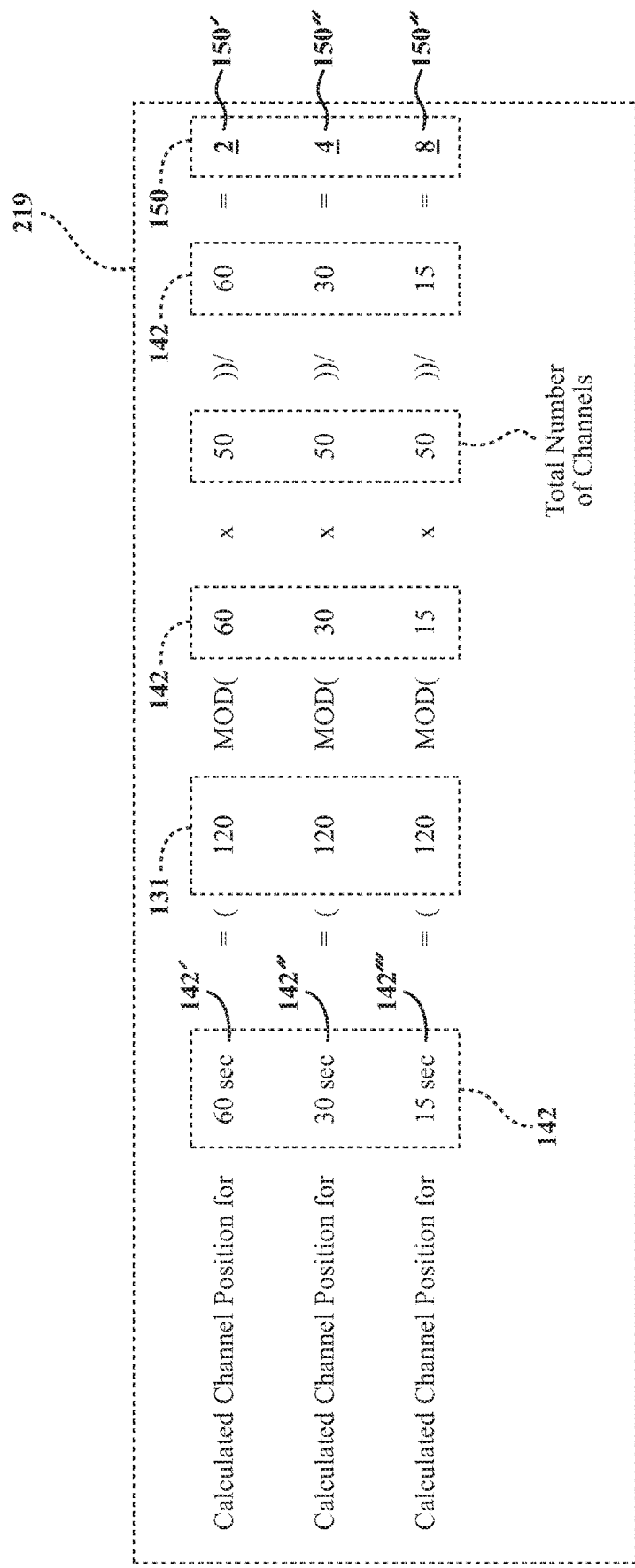
FIG. 9A is an equation illustrating the step of determining the channel position of the subsequent frequency for each of the potential sequences of RF channels.

In accordance with the above-stated potential sequences of RF channels 116', 116", 116'", FIG. 9A illustrates three iterations of step 219. In FIG. 9A, calculated channel positions 150', 150", 150'" of the subsequent frequency 122 are produced for each of the three potential sequences of RF channels 116', 116", 116'" using the potential bubble-up times 142', 142", 142'". In the instance of FIG. 9A, the potential bubble-up times 142 are 60 seconds, 30 seconds, and 15 seconds. Accordingly, calculated channel positions 150', 150", and 150'" are produced using the 60 second potential bubble-up time 142', the 30 second potential bubble-up time 142", and the 15 second potential bubble-up time 142'", respectively.

In FIG. 9A, step 219 includes a step of performing, with the processor 185, a modulo operation (represented using "MOD"). As shown in FIG. 9A, the modulo operation is performed on a combination of the time elapsed 131, the potential bubble-up times 142, and the total number of RF channels 119. Accordingly, the calculated channel position 150' corresponding to the 60 second bubble-up time 142' is determined to be channel position 2; the calculated channel position 150" corresponding to the 30 second bubble-up time 142" is determined to be channel position 4, and the calculated channel position 150' corresponding to the 15 second bubble-up time 142'" is determined to be channel position 8.

It should be appreciated that, while the step of performing the modulo operation suitably produces the calculated channel position 150 in FIG. 9A, the modulo operation may be substituted for any algorithm or equation suitable for producing the calculated channel position 150. Furthermore, any suitable combination of the time elapsed 131, the potential bubble-up times 142, and the total number of RF channels 119 may be used for producing the calculated channel position 150. Similarly, the time elapsed 131, the potential bubble-up times 142, and the total number of RF channels 119 may be substituted for any other variable or variables suitable for producing the calculated channel position 150.

Referring back to FIG. 8, once the calculated channel positions 150 are produced, the method 200 proceeds to step 220, the step of determining whether a frequency 120 is already assigned to the calculated channel position 150 in a potential sequence of RF channels 116. If it is determined that a frequency 120 is not already assigned to the calculated channel position 150 in the potential sequence of RF channels 116 during step 220, the method 200 continues to step 221, the step of assigning the subsequent frequency 122 to the calculated channel position 150. Conversely, if a frequency 120 is already assigned to the calculated channel position 150 in the potential sequence of RF channels 116, the method 200 continues to step 222, the step of designating the subsequent frequency 122 as an unassigned frequency 170 of the potential sequence of RF channels 116.

Figure 9B:
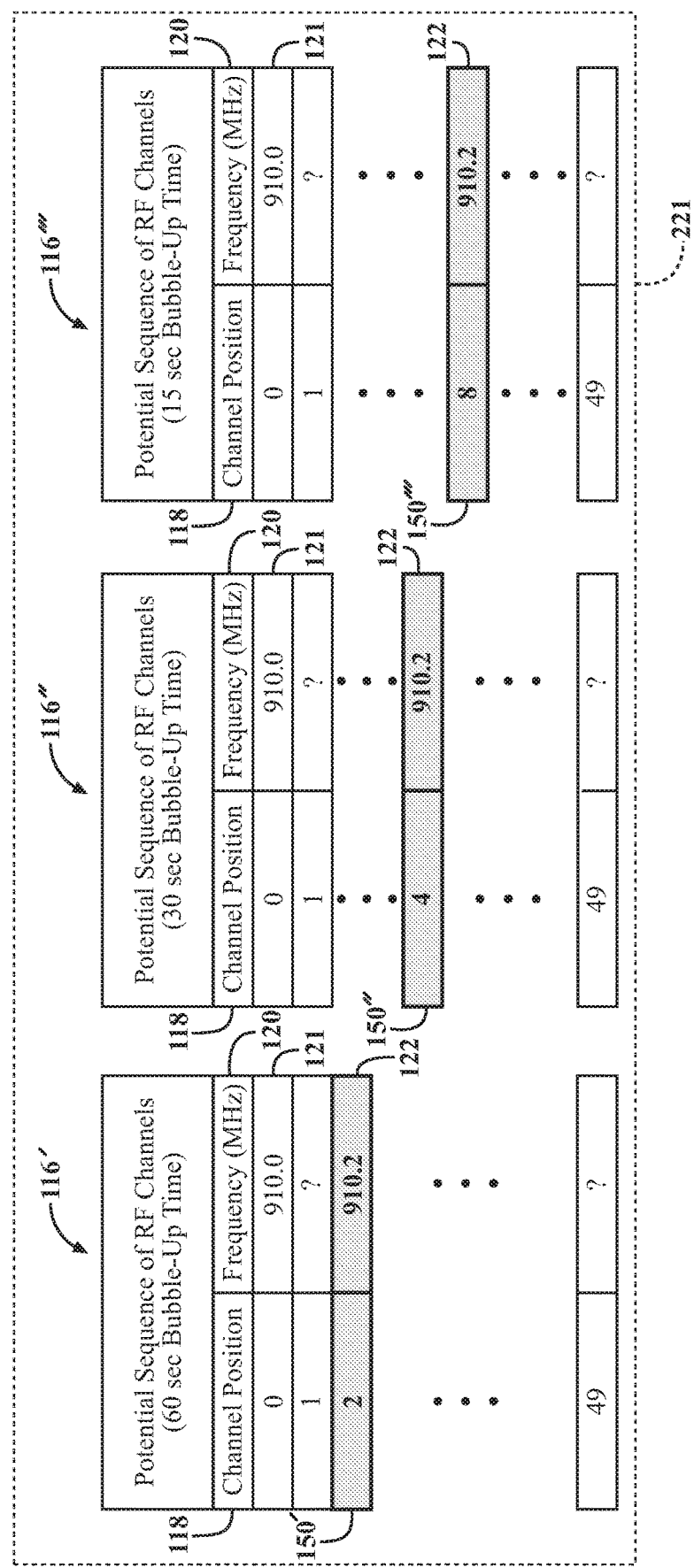
FIG. 9B and FIG. 9C are table diagrams illustrating the potential sequences of RF channels.

In accordance with the above-stated potential sequences of RF channels 116', 116", 116"', FIG. 9B illustrates three iterations of step 221. As previously stated, during step 221, the subsequent frequency 122 is assigned to the calculated channel position 150 in the potential sequence of RF channels 116. Also previously stated, the method 200 continues to step 221 if a frequency 120 is not already assigned to a calculated channel position 150. In FIG. 9B, a frequency 120 is not assigned to the calculated channel positions 150' (channel position 2 in the potential sequence of RF channels 116'), 150" (channel position 24 in the potential sequence of RF channels 116"), and 150"' (channel position 48 in the potential sequence of RF channels 116"'). Therefore, the subsequent frequency 122 of 910.2 MHz is assigned to the calculated channel positions 150', 150", 150"'.

Figure 9C:
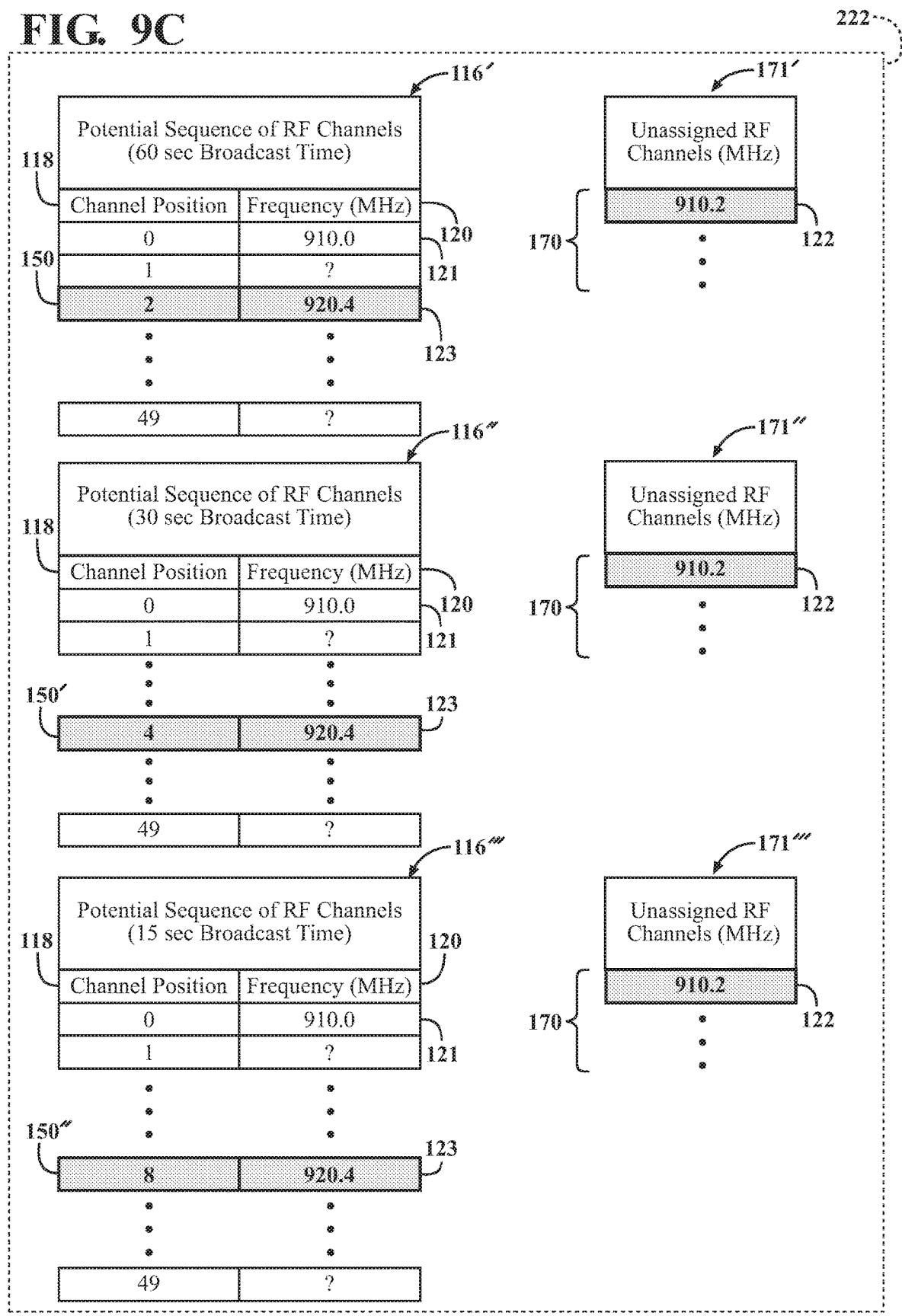

In accordance with the above-stated potential sequences of RF channels 116', 116", 116"', FIG. 9C illustrates three iterations of step 222. As previously stated, during step 222, the subsequent frequency 122 is designated as an unassigned frequency 170 of the potential sequence of RF channels 116. Also previously stated, the method 200 continues to step 222 if a frequency 120 is already assigned to a calculated channel position 150. In FIG. 9C, a frequency 123 of 920.4 MHz is already assigned to the calculated channel positions 150' (channel position 2), 150" (channel position 24), and 150"' (channel position 48). Therefore, the subsequent frequency 122, 910.2 MHz, is designated as an unassigned frequency 170. As shown in FIG. 9C, each potential sequence of RF channels 116 has a corresponding table of unassigned frequencies 171. In the instance of FIG. 9C, three tables of unassigned frequencies 171 are shown: a table of unassigned frequencies 171', corresponding to the potential sequence of RF channels 116'; a table of unassigned frequencies 171", corresponding to the potential sequence of RF channels 116"; and a table of unassigned frequencies 171"', corresponding to the potential sequence of RF channels 116'. As such, during step 222 the subsequent frequency 122, 910.2 MHz, is designated as an unassigned frequency 170 and placed in each table of unassigned frequencies 171', 171", 171"'.

Referring back to FIG. 6, if the method 200 determines, during step 213, that there are no subsequent frequencies 122 to be selected, i.e. the table of frequencies to assign 160 is determined to be empty, the method 200 continues to step 218. As previously stated, if the table of frequencies to assign 160 is determined to be empty, then the RF receiver 108 has been tuned to all frequencies 120 in the table of frequencies to assign 160. As such, all the frequencies 120 have either been assigned to a channel position 118 during step 221 or have been designated as an unassigned frequency 170 during step 222 for each of the potential sequences of RF channels 116. As follows, step 218 is carried out to determine the channel positions 118 of the unassigned frequencies 170.

During step 218, the RF receiver 108 assigns the unassigned frequencies 170 to channel positions 118 in the potential sequences of RF channels 116. To accomplish this, the RF receiver is tuned according to the potential sequences of RF channels 116, even if the potential sequences of RF channels 116 includes RF channels where the channel positions 118 are not assigned a frequency 120. More specifically stated, for each channel position 118 in each potential sequence of RF channels 116, if a frequency 120 is assigned to the channel position 118, then the RF receiver 108 is tuned to the frequency 120. Otherwise, the RF receiver 108 is tuned to an unassigned frequency 170. If the RF receiver 108 receives a usage data transmission from the AMR device 104 while tuned to the unassigned frequency 170, then the unassigned frequency 170 is assigned to the channel position 118.

Step 218 is further illustrated in FIG. 10A. As shown, step 218 includes a step 223 of determining, with the processor 185, whether any of the tables of unassigned frequencies 171 are empty. For example, in the above-stated example including the table of unassigned frequencies 171', 171", 171"', the method 200 determines whether any of the tables of unassigned frequencies 171', 171", 171"' are empty during step 223. Step 218 also includes a step 224' of determining the channel positions 118 of the unassigned frequencies 170 of a first potential sequence of RF channels. In the above-stated instance, the first potential sequence of RF channels may be the potential sequence of RF channels 116', but in other instances, the first potential sequence of RF channels may be any potential sequence of RF channels 116, such as the potential sequence of RF channels 116"'. Therefore, during step 224', the method 200 determines the channel positions 118 of the unassigned frequencies 170 in the corresponding table of unassigned frequencies 171'.

In the above-stated instance, the method 200 also determines the channel positions 118 of the unassigned frequencies 170 in each table of unassigned frequencies 171', 171", 171"'. Therefore, as shown in FIG. 10A, the method 200 may include steps 224", 224"', as well as step 224'. It should be noted that, in instances where there are more than three potential sequences of RF channels 116, step 218 may include more steps. Similarly, in an instance where there are less than three potential sequences of RF channels 116, step 218 may include less steps. During step 218, the method 200 proceeds from one of step 224', 224", 224"' to another of step 224', 224", 224"' based a timeout counter of steps 236' and 237', which will be further described herein. Steps 236' and 237' correspond to step 224'. Similarly, the method 200 may include other instances of steps 236' and 237', such as steps 236" and 237", which correspond to step 224", and steps 236"' and 237', which correspond to step 224". In instances where there are a different number of potential sequences of RF channels 116, step 218 may include a different number of instances of steps 236' and 237'.

Figure 10B:
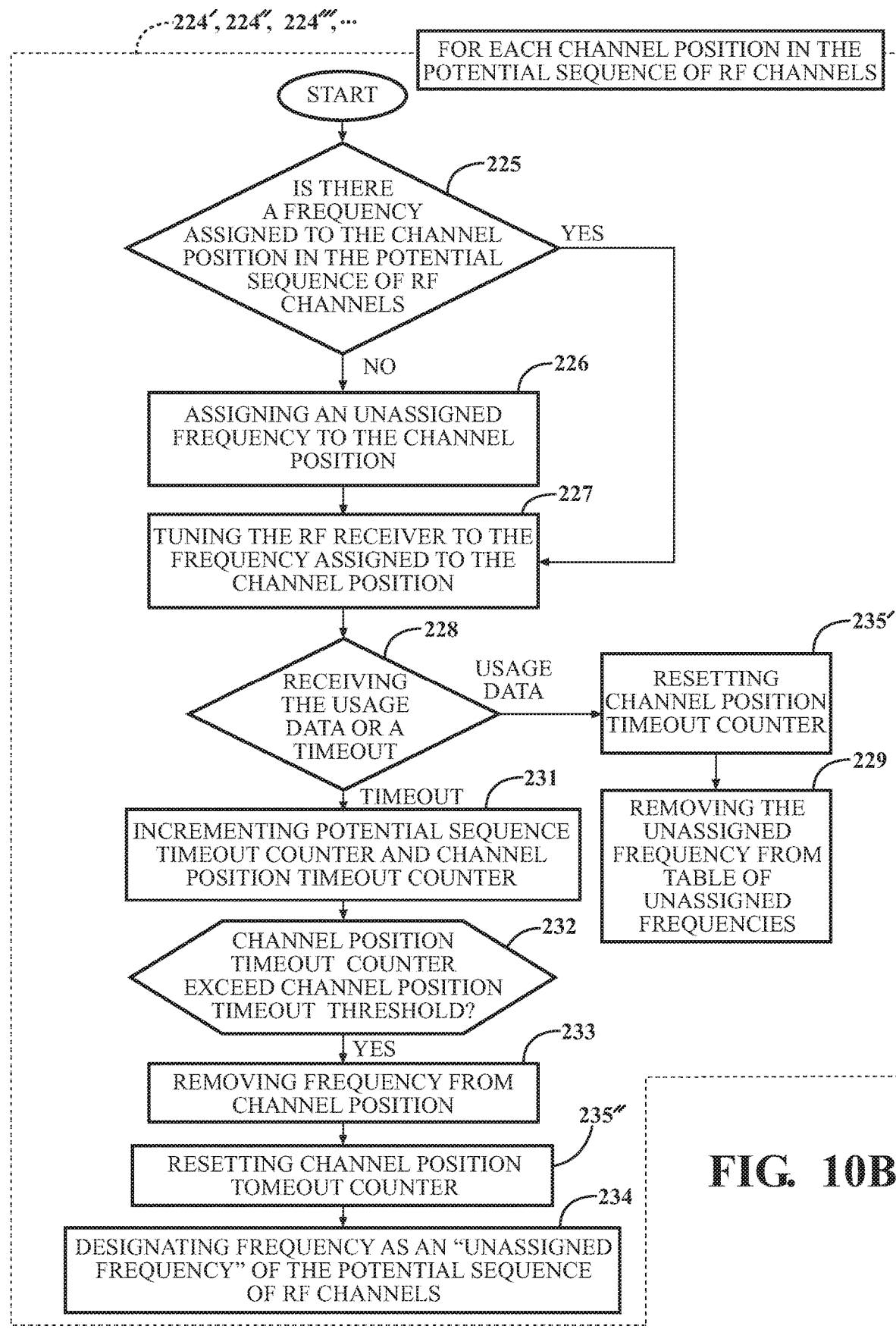
FIG. 10B is a flowchart illustrating steps of determining the channel positions of unassigned frequencies for a potential sequence of RF channels.

An instance of steps 224', 224", 224"' is further illustrated in FIG. 10B. As shown, steps 224', 224", 224"' include a step 225 of determining, with the processor 185, whether a frequency 120 is assigned to a channel position 118 in a potential sequence of RF channels 116. If there is a frequency 120 assigned to the channel position 118, the method 200 proceeds to a step 227 of tuning, with the tuner 184, the RF receiver 108 to the frequency 120 assigned to the channel position 118. Otherwise, the method 200 proceeds to a step 226 of assigning, with the processor 185, an unassigned frequency 170 of the table of unassigned frequencies 171 to the channel position 118 before tuning the RF receiver 108 to the unassigned frequency 170 during step 227.

After step 227, the method 200 proceeds to a step 228 of receiving, with the antenna 181, the usage data or a timeout. If the usage data is received during step 228, the method 200 resets the channel position timeout counter during step 235'. If an unassigned frequency 170 was assigned to the channel position 118 during step 226, the method 200 proceeds to a step 229 of removing, with the processor 185, the unassigned frequency 170 from the table of unassigned frequencies 171 corresponding to the potential sequence of RF channels 116.

If the timeout is received during step 228, the method 200 proceeds to a step 231 of incrementing, with the processor 185, a total timeout counter, which corresponds to the potential sequence of RF channels 116, and a channel position timeout counter, which corresponds to the channel position 118, to which the frequency 120 or the unassigned frequency 170 is assigned during step 226. The method 200 then proceeds to a step 232 of determining, with the processor 185, whether the channel position timeout counter has exceeded a channel position timeout threshold. It should be noted that, during the method 200, steps 224', 224", 224'" may be repeated, as shown in FIG. 10A. As such, the channel position timeout counter accumulates if the channel position timeout counter is not reset. If the channel position timeout counter has exceeded the channel position timeout threshold, the frequency 120 or the unassigned frequency 170 is removed from the channel position 118 after the channel position timeout counter is reset during step 235". During step 234, the frequency 120 or unassigned frequency 170 that is removed from the channel position 118 is designated (or remains designated) as an unassigned frequency 170 of the potential sequence of RF channels 116.

Referring back to FIG. 10A, the method 200 proceeds to steps 224", 224'" after step 224' if the timeout counter corresponding to the first potential sequence of RF channels exceeds a sequence timeout threshold, which may be any suitable number. As shown, the method 200, during steps 236', 236", 236'", determines whether a timeout counter corresponding to the first, second, or third potential sequence of RF channels exceeds the sequence timeout threshold. For example, in the above-stated instance, the method 200, during step 236', determines whether the timeouts received previously in step 224' exceeded a sequence timeout threshold of thirty-five. If, during step 236', the method 200 determines that more than thirty-five timeouts were previously received during step 224', the method 200 proceeds to step 236" and potentially to step 224". If, however, the method 200 determines that less than thirty-five timeouts were received, the method 200 proceeds to a step 237' of resetting the timeout counter corresponding to the potential sequence of RF channels 116' before repeating step 224'.

Additionally, steps 224', 224", 224'" are executed until at least one of the tables of unassigned frequencies 171', 171", 171'" is empty. In some instances, the steps 224', 224", 224'" may be executed until a timeout counter corresponding to the potential sequence of RF channels 116 is below an desired sequence timeout threshold. For example, in an instance where the sequence timeout threshold is thirty-five and the desired sequence timeout threshold is five, the method 200 may repeat step 224' if the timeout counter corresponding to the first potential sequence of RF channels is lower than thirty-five, but greater than five. In such an instance, the method 200 may also repeat step 224' until the table of unassigned frequencies corresponding to the first potential sequence of RF channels is empty.

Figure 11A:
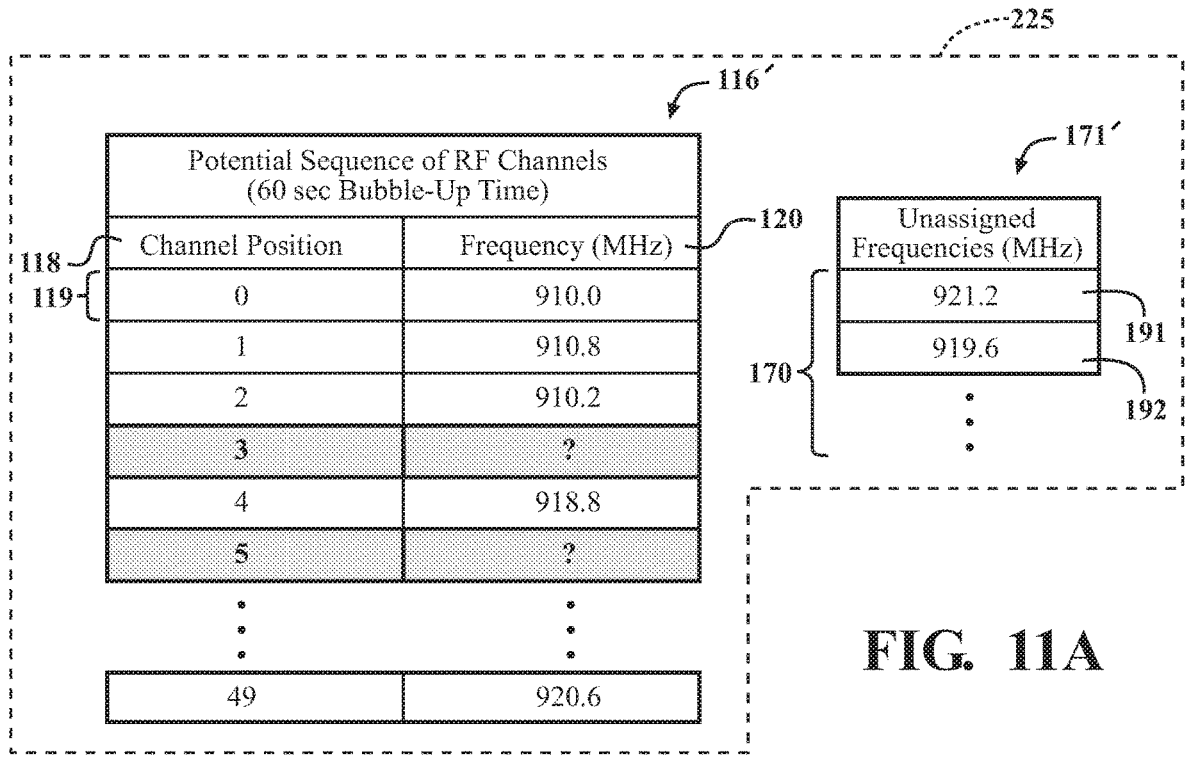
FIG. 11A is a table diagram illustrating a potential sequence of RF channels and a table of unassigned frequencies.
Figure 11B:
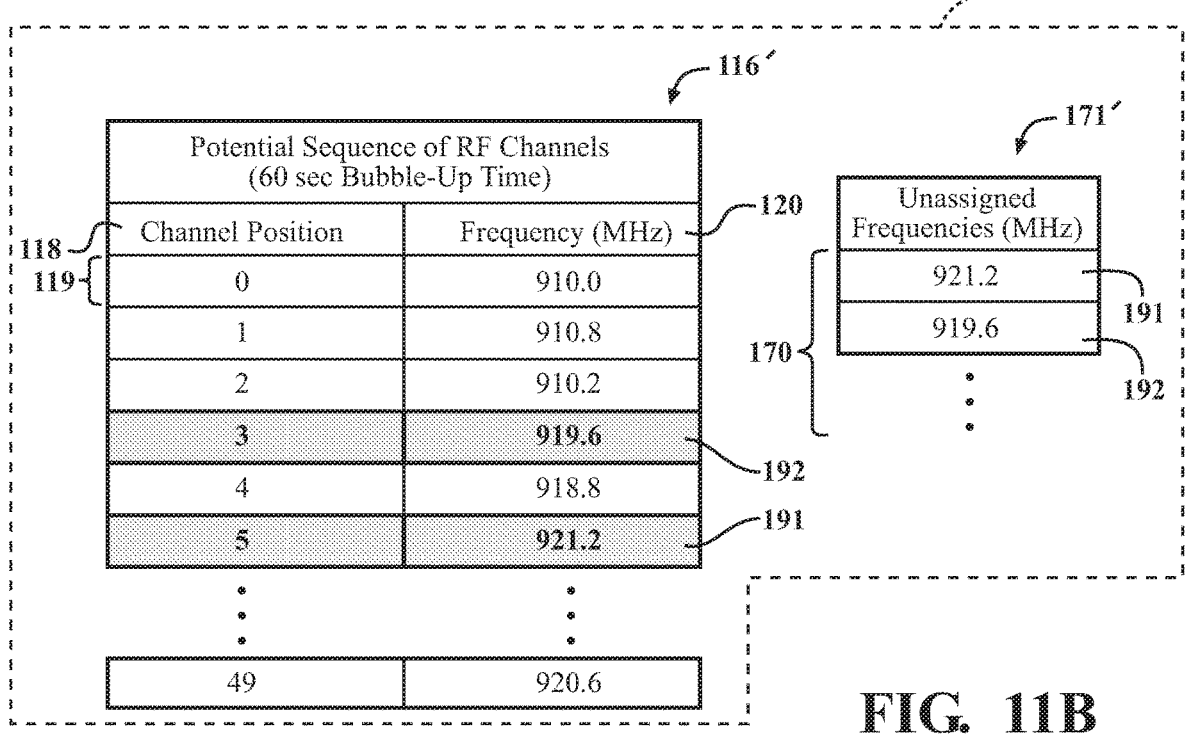
FIG. 11B is a table diagram illustrating the potential sequence of RF channels with the unassigned frequencies assigned to a channel position of the potential sequence of RF channels.
Figure 11C:
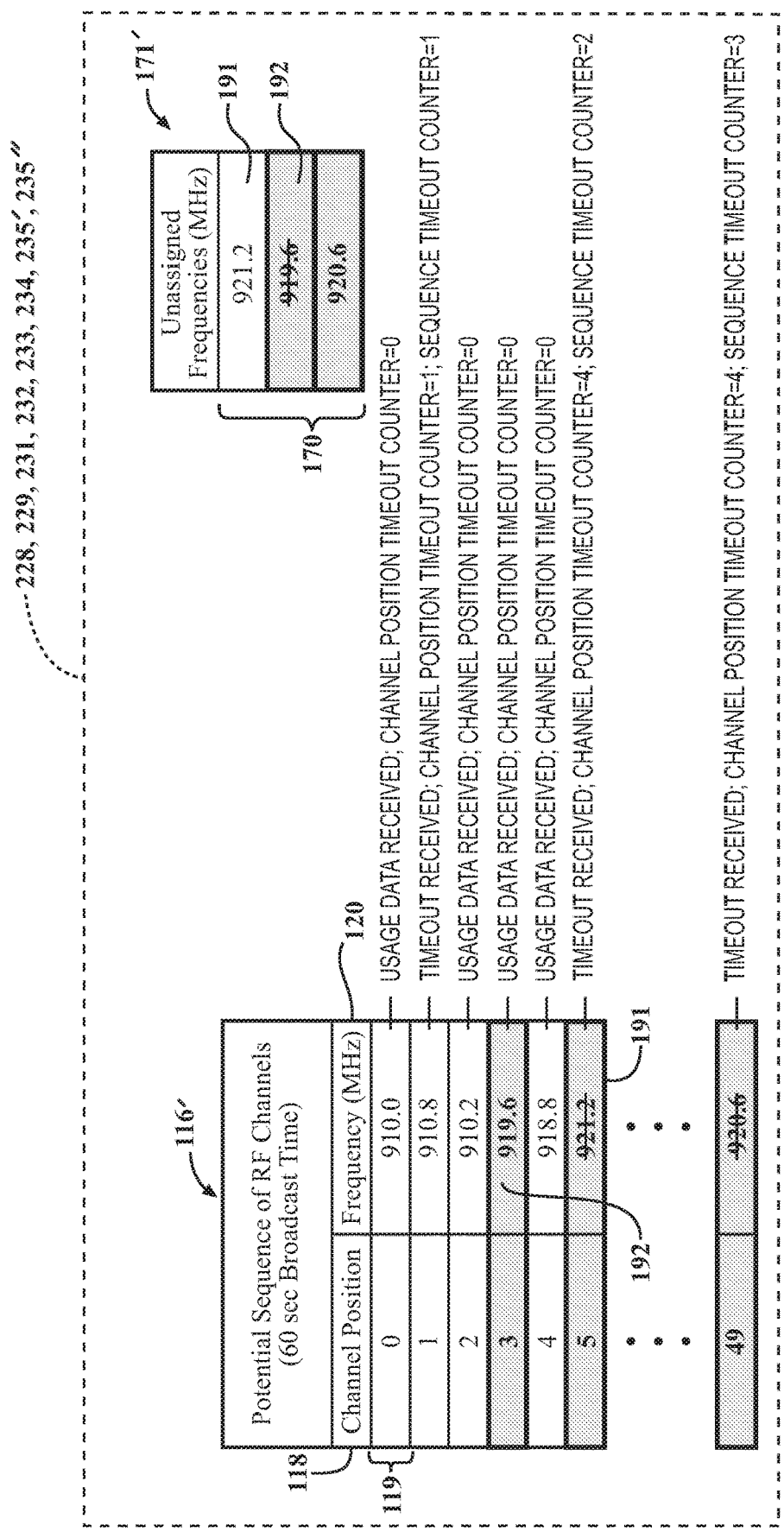
FIG. 11C is a table diagram illustrating the potential sequence of RF channels with frequencies removed from channel positions of the potential sequence of RF channels and designed as unassigned frequencies.

To further explain steps 224', 224", 224'", FIG. 11A, FIG. 11B, and FIG. 11C illustrate an instance of step 224'. As shown in FIG. 10B, 224", 224'" include steps similar to step 224', but in step 224", 224'", the steps of 224' are applied to the potential sequences of RF channels 116", 116'" and the corresponding tables of unassigned frequencies 171", 171'" instead of the potential sequence of RF channels 116' and the corresponding table of unassigned frequencies 171'. However, for purposes of demonstration, FIG. 11A and FIG. 11B only provide an instance of step 224'. But, it should be appreciated that steps 224", 224'" may be similarly illustrated with the potential sequence of RF channels 116" and the table of unassigned frequencies 171", and the potential sequence of RF channels 116'" and the table of unassigned frequencies 171'", respectively.

FIG. 11A illustrates an instance of step 225 of step 224'. As previously stated, during step 225, the method determines whether a frequency 120 is assigned to a channel position 118 in a potential sequence of RF channels 116. As shown in FIG. 11A, some channel positions 118 of the potential sequence of RF channels 116' are assigned a frequency 120. However, some channel positions 118 in the potential sequence of RF channels 116' are not assigned a frequency 120. For example, no frequency 120 has been assigned to channel position 3 and channel position 5 in the potential sequence of RF channels 116'. Therefore, in such an instance, the method 200 would determine, during step 225, that there is a frequency 120 assigned to channel positions 0, 1, 2, 4, and 49 and that there is no frequency 120 assigned to channel positions 3 and 5. It should be noted that, for purposes of convenience, only channel positions 0, 1, 2, 3, 4, 5, and 49 of the potential sequence of RF channels 116' are shown. However, the method 200 may determine that there may or may not be a frequency 120 assigned to any other channel positions 118 of the potential sequence of RF channels 116'.

For channel positions 0, 1, 2, 4, and 49 in the potential sequence of RF channels 116' shown in the instance of FIG. 11A, the method 200 may determine that a frequency 120 is assigned to the channel position 118 during step 225 and proceed to step 227. During step 227, the RF receiver 108 is tuned to the frequency 120 assigned to the channel position 118.

Conversely, for channel positions 3 and 5 in the potential sequence of RF channels 116', the method 200 may determine that a frequency 120 is not assigned to the channel position 118 during step 224 and proceed to step 226, where an unassigned frequency 170 of the table of unassigned frequencies 171' is assigned to the channel position 118.

FIG. 11B illustrates an instance of step 226 of step 224'. As previously stated, during step 226, an unassigned frequency 170 of the unassigned frequencies 171 is assigned to the channel position 118. As shown in FIG. 11B, an unassigned frequency 192 of 919.6 MHz is assigned to channel position 3. Similarly, an unassigned frequency 191 of 921.2 MHz, is assigned to channel position 5. After step 226, the method 200 proceeds to step 227, where the RF receiver 108 is tuned to the unassigned frequency 170 which is assigned to the channel position 118.

It should be noted that, during step 226, any unassigned frequency 170 in the table of unassigned frequencies 171 may be assigned to the channel position 118 without an assigned frequency 120. Additionally, the unassigned frequency 170 may be assigned to any channel position 118 without an assigned frequency 120. For example, in FIG. 11A, the unassigned frequency 192 of 919.6 MHz may be assigned to channel position 3. However, unassigned frequency 191 of 921.2 MHz may be assigned to channel position 3. Furthermore, the unassigned frequency 192 of 919.6 MHz may be assigned to channel position 5.

After the RF receiver 108 is tuned to a frequency 120 or an unassigned frequency 170 during step 227, the method 200 proceeds to steps 228, 229, 231, 232, 233, 234, and 235', 235", which are illustrated in FIG. 11C. During step 228, usage data or a timeout is received from the AMR device 104. If the method 200 receives a timeout during step 227, the method 200 may proceed to step 231, where a timeout counter corresponding to the potential sequence of RF channels 116' (labelled as "sequence timeout counter") is incremented, as well as a timeout counter corresponding to the channel position 118 (labelled as "channel position timeout counter"). If the channel position timeout counter exceeds a channel position timeout threshold during step 232, the frequency 120 or unassigned frequency 170 is removed from the channel position 118 and designated (or remains designated) an unassigned frequency 170. In the event that the frequency 120 is not in the corresponding table of unassigned frequencies 171, the frequency would 120 then be added to the table of unassigned frequencies 171.

For example, in the instance of FIG. 11C, a timeout is received for the frequency 120 in channel position 1, 910.8 MHz, and the channel position timeout counter for the channel position 1 is incremented by one, giving the channel position 1 timeout counter a total of one timeout received. In FIG. 11C, the channel position timeout threshold is three and, therefore, 910.8 MHz is not removed from channel position 1 during step 233 and is not designated an unassigned frequency 170 during step 234. It should be noted that, while the channel position timeout threshold is three in the instance of FIG. 11C, any suitable number may be used for the channel position timeout threshold. Additionally, the sequence timeout counter is incremented by one, giving the sequence timeout counter for the potential sequence of RF channels 116' a total of one timeout received.

In the instance of FIG. 11C, a timeout is also received for the unassigned frequency 191 in channel position 5, 921.2 MHz. After incrementing the channel position 5 timeout counter, the channel position 5 timeout counter has a total of four timeouts received. As such, the 921.2 MHz is removed from the channel position 5 during step 233. However, since 921.2 MHz is already an unassigned frequency 170 in the table of unassigned frequencies 171', there is no need to designate 921.2 MHz as an unassigned frequency 170 of the potential sequence of RF channels 116' during step 234. The channel position 49 timeout counter is then reset during step 235". Additionally, the sequence timeout counter is incremented by one, giving the sequence timeout counter for the potential sequence of RF channels 116' a total of two timeouts received.

As shown in FIG. 11C, a timeout is also received for the frequency 120 in channel position 49, 920.6 MHz. After incrementing the channel position 49 timeout counter, the channel position 49 timeout counter has a total of four timeouts received. As such, the 920.6 MHz is removed from channel position 49 during step 233. Since 920.6 MHz is not an unassigned frequency 170 in the table of unassigned frequencies 171', 920.6 MHz is designated as an unassigned frequency 170 of the potential sequence of RF channels 116' and added to the table of unassigned frequencies 171', as shown in FIG. 11C during step 234. The channel position 49 timeout counter is then reset during step 235". Additionally, the sequence timeout counter is incremented by one, giving the sequence timeout counter for the potential sequence of RF channels 116' a total of three timeouts received.

Conversely, if usage data is received instead of a timeout, the method 200 proceeds to steps 235' where the channel position timeout counter is reset to 0. If the usage data is received for an unassigned frequency 170, the method 200 may proceed to step 229 and the unassigned frequency 170 is removed from the table of unassigned frequencies 171. For example, as shown in the instance of FIG. 11C, usage data is received for the unassigned frequency 192, 919.6 MHz, assigned to channel position 3. As such, the channel position 3 timeout counter is reset to 0 and 919.6 MHz is removed from the table of unassigned frequencies 171'.

Usage data is also received for frequencies 910.0 MHz, 910.2 MHz, and 918.8 MHz, and channel position 0, 2, 4 timeout counters are reset to 0. However, because 910.0 MHz, 910.2 MHz, and 918.8 MHz are not in the table of unassigned frequencies 171' and are not unassigned frequencies 170, there is no need to remove them. Additionally, the sequence timeout counter is not incremented in these instances because no timeout was received.

It should be noted that the sequence timeout counter for the potential sequence of RF channels 116' is at three timeouts after the instance of step 224' shown in FIG. 11C. Furthermore, the table of unassigned frequencies 171' includes 921.2 MHz and 920.6 MHz. As such, referring to FIG. 10A, the method 200 proceeds to step 223, where it is determined that the table of unassigned frequencies 171' is not empty, before proceeding to step 236', where it is determined that the sequence timeout counter does not exceed the sequence timeout threshold of thirty-five. The method 200 then resets the sequence timeout counter for the potential sequence of RF channels 116' before repeating another instance of step 224'.

As previously stated, step 218 concludes when the method 200 determines that at least one of the tables of unassigned frequencies 171 is empty during step 223. As shown in FIG. 6, when step 218 concludes, step 230 also concludes. Referring now to FIG. 5A, after the method 200 determines the potential sequences of RF channels 116 during step 230, the method 200 proceeds to step 240, the step of determining the sequence of RF channels 117 based on the potential sequences of RF channels 116.

Figure 12:
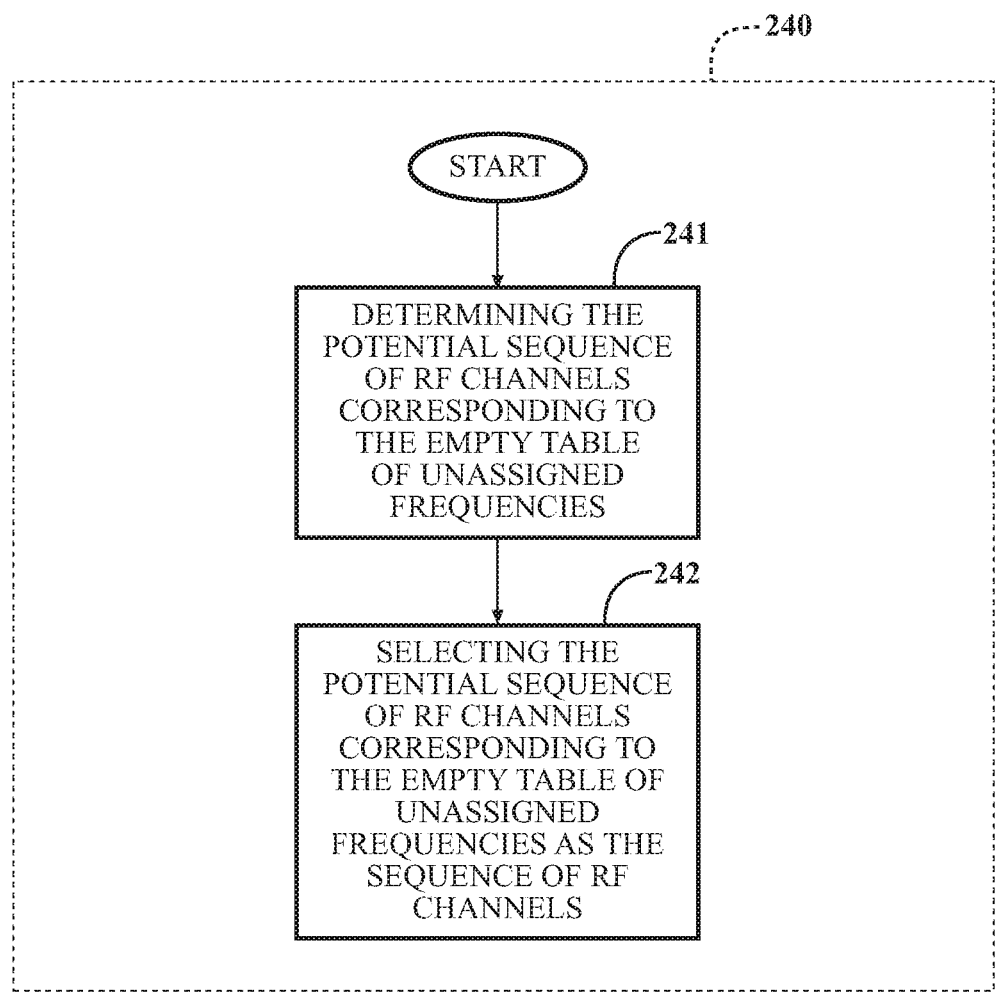
FIG. 12 is a flowchart illustrating a step of determining the sequence of RF channels based on the potential sequences of RF channels.

FIG. 12 further illustrates step 240. As shown, step 240 includes a step 241 of determining, with the processor 185, the potential sequence of RF channels 116 corresponding to the table of unassigned frequencies 171, which is determined to be empty during step 223. After determining the potential sequence of RF channels 116 during step 241, the method 200 proceeds to a step 242 of selecting, with the processor 185, the potential sequence of RF channels 116 corresponding to the empty table of unassigned frequencies 171 as the sequence of RF channels 117. In instances where step 218 is executed until a timeout counter corresponding to a potential sequence of RF channels 116 is below a desired sequence timeout threshold, the potential sequence of RF channels 116 corresponding to the timeout counter below the desired sequence timeout threshold is chosen during step 242.

IV. Receiving the Usage Data

After the RF receiver 108 determines the sequence of RF channels 117 during step 210, the method 200 continues to step 250, the step of receiving the usage data by tuning the RF receiver 108 to a frequency 120 based on the sequence of RF channels 117. In an example instance of the sequence of RF channels 117 shown in FIG. 1, the RF receiver 108 is tuned to 910.0 MHz at channel position 0. After receiving the usage data at channel position 0, the RF receiver 108 is tuned to 910.8 MHz at channel position 1, before proceeding to channel position 2, and so on until the RF receiver 108 is tuned to 917.2 MHz at channel position 49.

Furthermore, it should be noted that, for step 250, each channel position 118 of the sequence of RF channels 117 need not be assigned a frequency 120. In such situations, the RF receiver 108 may be tuned to a default frequency, or may be tuned to the frequency 120 corresponding to the next channel position 118.

V. Presenting the Usage Data to a User

Figure 13A:
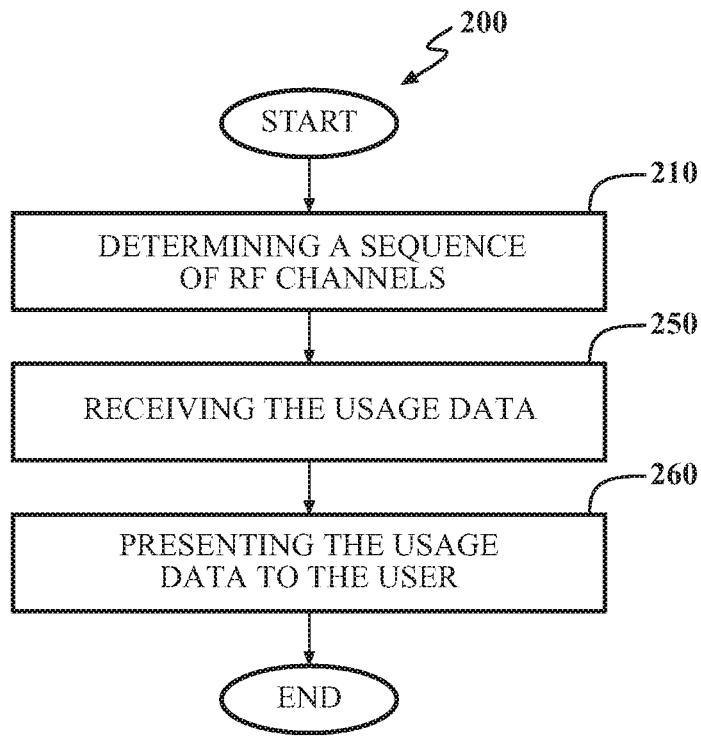
FIG. 13A is a flowchart illustrating an embodiment of the method of capturing the usage data of the usage area where the method includes a step of presenting the usage data to a user.

In a further instance of the method 200, the method 200 may include a step of presenting the usage data to the user 114, demonstrated by step 260 in FIG. 13A. In such an instance, the usage area 102 is provided with the gateway device 110, where the gateway device 110 is coupled to the RF receiver 108. For example, the system 100, shown in FIG. 1, is one such instance. As such, the gateway device 110 is able to receive the usage data from the RF receiver 108.

Figure 13B:
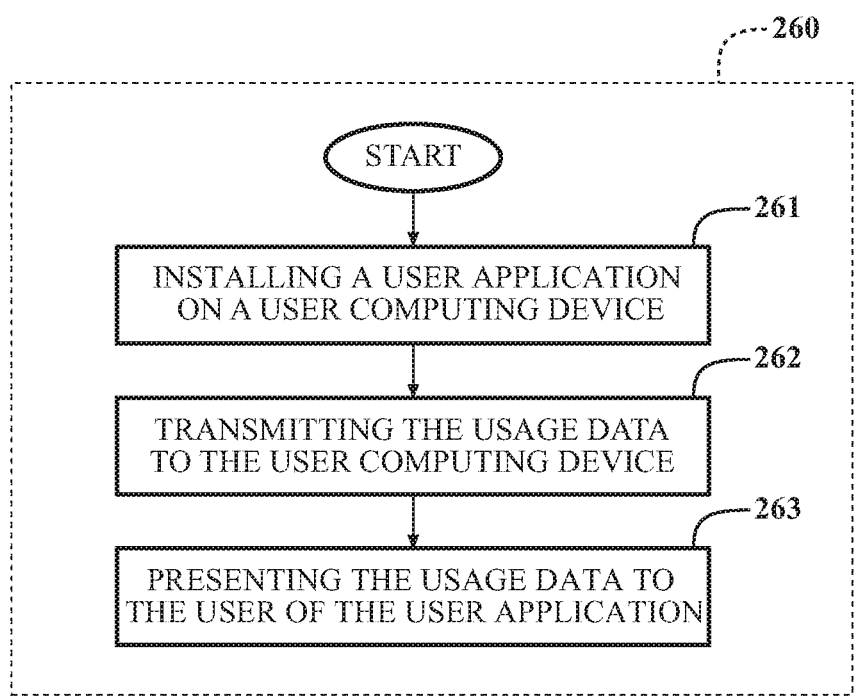
FIG. 13B is a flowchart illustrating the step of presenting the usage data to the user.

Furthermore, as shown in FIG. 13B, the step of presenting the usage data to the user 114 may include a step 261 of installing, with the user computing device 112, a user application for communicating with the gateway device 110; a step 262 of transmitting, with the gateway device 110, the usage data to the user computing device 112; and a step 263 of presenting the usage data to the user 114 of the user application. As such, the method 200 is able to present the usage data received from the RF receiver 108 to the user 114.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A method of capturing usage data of a usage area comprising an automatic meter reading (AMR) device for broadcasting the usage data according to a sequence of radio-frequency (RF) channels via a frequency-hopping spread spectrum signal once during a bubble-up time, and wherein the usage area is provided with an RF receiver comprising an antenna and an RF receiver circuit comprising a tuner and a processor, the method comprising steps of:

determining, with the processor of the RF receiver circuit, the sequence of RF channels, wherein each RF channel of the sequence of RF channels comprises a frequency assigned to a channel position, the RF channels of the sequence of RF channels being sequenced based on the channel positions, wherein the processor is configured to determine the sequence of RF channels by:

determining, with the processor, a potential sequence of RF channels based on potential bubble-up times, wherein the potential sequence of RF channels comprises potential frequencies assigned to potential channel positions, the RF channels of the potential sequence of RF channels being sequenced based on the potential channel positions, wherein the processor is configured to determine the potential sequence of RF channels by:

tuning, with the tuner, the RF receiver to a first frequency;

receiving, with the antenna, a first usage data on the first frequency;

tuning, with the tuner, the RF receiver to a subsequent frequency;

receiving, with the antenna, a subsequent usage data on the subsequent frequency;

determining, with the processor, a time elapsed between reception of the first usage data and reception of the subsequent usage data; and determining, with the processor, a potential channel position of the subsequent frequency for the potential sequence of RF channels based on the time elapsed between the reception of the first usage data and the reception of the subsequent usage data by calculating, with the processor, the potential channel position of the subsequent frequency based on the time elapsed to produce a calculated channel position for the potential sequence of RF channels; and determining, with the processor, the sequence of RF channels based on the potential sequence of RF channels; and receiving, with the antenna, the usage data by tuning the RF receiver, with the tuner of the RF receiver circuit, to a frequency based on the sequence of RF channels.

2. The method as set forth in claim 1, wherein the step of receiving the usage data comprises a step of tuning, with the tuner, the RF receiver to receive the usage data broadcast over a frequency within a frequency bandwidth, wherein a single frequency of the sequence of RF channels is within the frequency bandwidth.

3. The method as set forth in claim 1, wherein determining the potential channel position of the subsequent frequency for the potential sequence of RF channels based on the time elapsed further comprises a step of assigning, with the processor, the first frequency to a first potential channel position of the potential sequence of RF channels.

4. The method as set forth in claim 1, wherein the time elapsed is based on a system time of the RF receiver.

5. The method as set forth in claim 1, wherein calculating the potential channel position of the subsequent frequency for the potential sequence of RF channels based on the time elapsed further comprises a step of performing, with the processor, a modulo operation to produce the calculated channel position for the potential sequence of RF channels.

6. The method as set forth in claim 5, wherein the step of determining the potential channel position of the subsequent frequency for the potential sequence of RF channels based on the time elapsed further comprises steps of:

determining, with the processor, whether a potential frequency is assigned to the calculated channel position produced for the potential sequence of RF channels;

assigning, with the processor, the subsequent frequency to the calculated channel position produced for the potential sequence of RF channels in response to determining that a potential frequency is not assigned to the calculated channel position produced for the potential sequence of RF channels; and designating, with the processor, the subsequent frequency as an unassigned frequency of the potential sequence of RF channels in response to determining that a frequency is assigned to the calculated channel position produced for the potential sequence of RF channels.

7. The method as set forth in claim 6, wherein the step of determining the potential channel position of the subsequent frequency for the potential sequence of RF channels based on the time elapsed further comprises a step of determining, with the processor, a potential channel position of the unassigned frequency of the potential sequence of RF channels.

8. The method as set forth in claim 7, wherein the step of determining the potential channel position of the unassigned frequency for the potential sequence of RF channels further comprises steps of:

determining, with the processor, whether a first potential frequency is assigned to a first potential channel position in the potential sequence of RF channels;

tuning, with the tuner, the RF receiver to the first potential frequency assigned to the first potential channel position in the potential sequence of RF channels in response to determining that the first potential frequency is assigned to the first potential channel position in the potential sequence of RF channels;

receiving, with the antenna, the usage data or a timeout;
incrementing, with the processor, a timeout counter in response to receiving the timeout; and
removing, with the processor, the first potential frequency from the first potential channel position and designating the first potential frequency as an unassigned frequency of the potential sequence of RF channels in response to the timeout counter exceeding a timeout threshold value.

9. The method as set forth in claim 7, wherein the step of determining the potential channel position of the unassigned frequency for the potential sequence of RF channels further comprises steps of:
determining, with the processor, whether a first potential frequency is assigned to a first potential channel position in the potential sequence of RF channels;
assigning, with the processor, a first unassigned frequency of the potential sequence of RF channels to the first potential channel position and tuning the RF receiver to the first unassigned frequency in response to determining that the first potential frequency is not assigned to the first potential channel position in the potential sequence of RF channels;
receiving, with the antenna, the usage data or a timeout;
incrementing, with the processor, a timeout counter in response to receiving the timeout;
removing, with the processor, the first potential frequency from the first potential channel position in response to the timeout counter exceeding a timeout threshold value.

10. The method as set forth in claim 7, wherein determining the sequence of RF channels based on the potential sequence of RF channels comprises a step of determining more than one potential sequence of RF channels and selecting, with the processor, the sequence of RF channels from the potential sequences of RF channels based on determining a potential channel position of an unassigned frequency of each of the more than one potential sequences of RF channels.

11. The method as set forth in claim 1, wherein the step of receiving the usage data by tuning the RF receiver to a frequency further comprises a step of receiving, with the antenna, the usage data or a timeout.

12. The method as set forth in claim 1, wherein the step of receiving the usage data by tuning the RF receiver comprises a step of tuning, with the tuner, the RF receiver to receive a signal within a frequency bandwidth.

13. The method as set forth in claim 12, wherein the frequency bandwidth is further defined as a bandwidth between 80 kilohertz and 800 kilohertz.

14. The method as set forth in claim 1, further comprising a step of presenting the usage data to a user.

15. The method as set forth in claim 14, wherein the usage area is provided with a gateway device, wherein the gateway device is coupled to the RF receiver.

16. The method as set forth in claim 15, wherein the RF receiver is coupled to a power supply of the gateway device.

17. The method as set forth in claim 15, wherein the gateway device is in wired connection with the RF receiver.

18. The method as set forth in claim 15, wherein the gateway device is wirelessly coupled to the RF receiver.

19. The method as set forth in claim 15, wherein the step of presenting the usage data to the user further comprises steps of:
installing, with a user computing device, a user application for communicating with the gateway device;
transmitting, with the gateway device, the usage data to the user computing device; and
presenting, with the user application, the usage data to the user.

20. The method as set forth in claim 1, wherein the usage data comprises at least one of an electrical energy consumption of the usage area, a gas usage of the usage area, and a water consumption of the usage area.

21. A system for capturing usage data of a usage area, wherein the usage area comprises an automatic meter reading (AMR) device configured to broadcast the usage data over a sequence of radio-frequency (RF) channels via a frequency-hopping spread spectrum signal, the system comprising:
an RF receiver comprising:
an antenna configured to receive the usage data from the AMR device on a first frequency and on a subsequent frequency; and
an RF receiver circuit coupled to the antenna, the RF receiver circuit comprising:
a tuner configured to tune the antenna to the first frequency and to the subsequent frequency; and
a processor configured to determine the sequence of RF channels by:
determining the sequence of RF channels with the RF receiver, wherein each RF channel of the sequence of RF channels comprises a frequency assigned to a channel position, the RF channels of the sequence of RF channels being sequenced based on the channel positions, wherein the processor is configured to determine the sequence of RF channels by:
determining a potential sequence of RF channels based on potential bubble-up times, wherein the potential sequence of RF channels comprises potential frequencies assigned to potential channel positions, the RF channels of the potential sequence of RF channels being sequenced based on the potential channel positions, wherein the processor is configured to determine the potential sequence of RF channels by:
determining, with the processor, a time elapsed between reception of a first usage data by the antenna and reception of a subsequent usage data by the antenna; and
determining a potential channel position of the subsequent frequency for the potential sequence of RF channels based on the time elapsed between the reception of the first usage data and the reception of the subsequent usage data by calculating the potential channel position of the subsequent frequency based on the time elapsed to produce a calculated channel position for the potential sequence of RF channels; and
determining the sequence of RF channels based on the potential sequence of RF channels; and
a gateway device coupled to the RF receiver and configured to transmit the usage data to a user computing device.

22. An RF receiver for capturing usage data of a usage area, wherein the usage area comprises an automatic meter reading (AMR) device configured to broadcast the usage data according to a sequence of radio-frequency (RF) channels via a frequency-hopping spread spectrum signal once during a bubble-up time, the RF receiver comprising:

an antenna configured to receive the usage data from the AMR device on a first frequency and on a subsequent frequency; and an RF receiver circuit coupled to the antenna, the RF receiver circuit comprising:

a tuner configured to tune the antenna to the first frequency and to the subsequent frequency; and a processor configured to determine the sequence of RF channels by:

determining the sequence of RF channels with the RF receiver, wherein each RF channel of the sequence of RF channels comprises a frequency assigned to a channel position, the RF channels of the sequence of RF channels being sequenced based on the channel positions, wherein the processor is configured to determine the sequence of RF channels by:

determining a potential sequence of RF channels based on potential bubble-up times, wherein the potential sequence of RF channels comprises potential frequencies assigned to potential channel positions, the RF channels of the potential sequence of RF channels being sequenced based on the potential channel positions, wherein the processor is configured to determine the potential sequence of RF channels by:

determining, with the processor, a time elapsed between reception of a first usage data by the antenna and reception of a subsequent usage data by the antenna; and determining a potential channel position of the subsequent frequency for the potential sequence of RF channels based on the time elapsed between the reception of the first usage data and the reception of the subsequent usage data by calculating the potential channel position of the subsequent frequency based on the time elapsed to produce a calculated channel position for the potential sequence of RF channels; and determining the sequence of RF channels based on the potential sequence of RF channels.

\* \* \* \* \*